US010322969B2

(12) United States Patent
Saida et al.

(10) Patent No.: US 10,322,969 B2
(45) Date of Patent: Jun. 18, 2019

(54) DISPERSANT COMPOSITION FOR HYDRAULIC COMPOSITION

(71) Applicant: KAO CORPORATION, Tokyo (JP)

(72) Inventors: Kazuya Saida, Wakayama (JP); Koji Koyanagi, Wakayama (JP); Masaaki Shimoda, Wakayama (JP); Shunya Tanaka, Wakayama (JP)

(73) Assignee: KAO CORPORATION, Tokyo (JP)

( * ) Notice: Subject to any disclaimer, the term of this patent is extended or adjusted under 35 U.S.C. 154(b) by 58 days.

(21) Appl. No.: 15/548,206

(22) PCT Filed: Mar. 17, 2016

(86) PCT No.: PCT/JP2016/058582
§ 371 (c)(1),
(2) Date: Aug. 2, 2017

(87) PCT Pub. No.: WO2016/148255
PCT Pub. Date: Sep. 22, 2016

(65) Prior Publication Data
US 2018/0029936 A1 Feb. 1, 2018

(30) Foreign Application Priority Data
Mar. 17, 2015 (JP) .................................. 2015-053367

(51) Int. Cl.
C04B 24/32 (2006.01)
C04B 24/08 (2006.01)
C04B 28/02 (2006.01)
C08L 71/02 (2006.01)
C04B 14/06 (2006.01)
C04B 24/22 (2006.01)
C04B 28/04 (2006.01)
C04B 40/00 (2006.01)
C08G 16/02 (2006.01)
C08L 61/00 (2006.01)
C04B 103/40 (2006.01)
C04B 103/50 (2006.01)

(52) U.S. Cl.
CPC .............. C04B 24/32 (2013.01); C04B 14/06 (2013.01); C04B 24/08 (2013.01); C04B 24/226 (2013.01); C04B 28/02 (2013.01); C04B 28/04 (2013.01); C04B 40/0039 (2013.01); C08G 16/0237 (2013.01); C08L 61/00 (2013.01); C08L 71/02 (2013.01); C04B 2103/408 (2013.01); C04B 2103/50 (2013.01)

(58) Field of Classification Search
CPC ......... C04B 24/32; C04B 28/04; C04B 14/06; C04B 24/226; C04B 24/08; C04B 2103/408
USPC .......................................................... 524/2
See application file for complete search history.

(56) References Cited

U.S. PATENT DOCUMENTS 5,192,366 A * 3/1993 Nishioka ............. C04B 24/2688
106/724
5,362,323 A * 11/1994 Koyata ............... C04B 24/2664
106/709
2004/0250737 A1* 12/2004 Yaguchi ................. C04B 24/02
106/808

FOREIGN PATENT DOCUMENTS

| JP | 48-28525 A | 4/1973 |
| JP | 50-150724 A | 12/1975 |
| JP | 54-153829 A | 12/1979 |
| JP | 55-23047 A | 2/1980 |
| JP | 55-023047 A | 2/1980 |
| JP | 60-11255 A | 1/1985 |
| JP | 60-011255 A | 1/1985 |
| JP | 61-281054 A | 12/1986 |
| JP | 62-3060 A | 1/1987 |
| JP | 07033502 * | 2/1995 |
| JP | 2000169719 A * | 6/2000 |
| JP | 2003-165755 A | 6/2003 |
| JP | 2006-169078 A | 6/2006 |
| WO | WO 03/024885 A2 | 3/2003 |

OTHER PUBLICATIONS

Translation of JP 2000-169719, Jun. 20, 2000. (Year: 2000).*
Translation of JP 07-033502, Feb. 3, 1995. (Year: 1995).*
International Preliminary Report on Patentability and English translation of the Written Opinion of the International Searching Authority (Forms PCT/IB/373 and PCT/ISA/237) for International Application No. PCT/JP2016/058582, dated Sep. 19, 2017.
Extended European Search Report, dated Oct. 22, 2018, for European Application No. 16765084.5.
International Search Report (PCT/ISA/210) issued in PCT/JP2016/058582, dated May 24, 2016.

* cited by examiner

Primary Examiner — Hui H Chin

(74) Attorney, Agent, or Firm — Birch, Stewart, Kolasch & Birch, LLP

(57) ABSTRACT

The present invention is a dispersant composition for a hydraulic composition, which includes (A) a cement dispersant composed of a polymer having a naphthalene ring-containing monomer unit, and (B) one or more specific alkylene oxide-added compounds represented by the general formula (B1), wherein a molar ratio of a total amount of (B) to the naphthalene ring-containing monomer unit in (A) is 3% or more and 16% or less.

17 Claims, No Drawings

DISPERSANT COMPOSITION FOR HYDRAULIC COMPOSITION

FIELD OF THE INVENTION

The present invention relates to a dispersant composition for a hydraulic composition, a dispersant composition for an inorganic powder, a hydraulic composition, a method for manufacturing a dispersant composition for a hydraulic composition, a method for manufacturing a hydraulic composition, and a method for improving dispersing performance.

BACKGROUND OF THE INVENTION

Dispersants for a hydraulic composition are chemical admixtures, and used for dispersing cement particles, thereby reducing a unit water quantity necessary for achieving a required slump and enhancing workability and the like of a hydraulic composition. Examples of conventionally-known dispersants include naphthalene-based dispersants such as a formaldehyde naphthalenesulfonate condensate, polycarboxylic acid-based dispersants such as a copolymer of a monomer having a carboxylic acid and a monomer having an alkylene glycol chain, and melamine-based dispersants such as a melaminesulfonic acid-formaldehyde condensate.

Compared to polycarboxylic acid-based dispersants and melamine-based dispersants, naphthalene-based dispersants are characterized in that they have smaller fluctuations in exhibiting the fluidity in response to changes of materials or temperatures, and a hydraulic composition obtained thereby has a relatively low viscosity and they are easy to use in manufacturing a hydraulic composition.

JP-A 61-281054 describes a chemical admixture for concrete, which contains a cement dispersant and a specific nonionic surfactant at a predetermined weight ratio.

JP-A 2003-165755 describes a workability-improving agent for improving workability of a cement composition, which contains a specific polyalkylene oxide derivative and/or a specific hydrocarbon derivative. JP-A 2003-165755 also describes a cement water-reducing agent containing the workability-improving agent and a water-reducing agent.

JP-A 55-023047 describes a slurry, which is composed of water and a hydraulic composition containing a β naphthalenesulfonic acid formaldehyde condensate and a nonionic surfactant having an oxyethylene chain.

JP-A 60-011255 describes a cement additive, which is composed of a formalin condensate of a metal salt of naphthalenesulfonate and a polyoxyethylene-based compound.

JP-A 48-028525 describes a method for manufacturing a concrete product, which includes molding a desired concrete product with concrete additionally containing an anionic surfactant, and performing atmospheric pressure steam curing of the molded product.

Meanwhile, use of a surfactant as a cement chemical admixture has also been conventionally proposed. JP-A 50-150724 describes a cement chemical admixture, which contains an anionic surfactant of sulfuric ester type and a polyoxyalkylene- or polyhydric alcohol-based nonionic surfactant.

SUMMARY OF THE INVENTION

The present invention provides a dispersant composition for a hydraulic composition, which provides a hydraulic composition with excellent fluidity.

The present invention relates to a dispersant composition for a hydraulic composition, which contains:
(A) a polymer compound having a naphthalene ring-containing monomer unit; and
(B) one or more compounds represented by the following general formula (B1),
wherein a molar ratio of a total amount of (B) to the naphthalene ring-containing monomer unit in (A) is 3% or more and 16% or less, $$R\text{—}X\text{-}(AO)_n\text{—}Y \qquad (B1)$$

wherein:
R is an alkyl group having a carbon number of 10 or more and 22 or less, an alkenyl group having a carbon number of 10 or more and 22 or less, a benzyl phenyl group having a carbon number of 13 or more and 27 or less, or a styrenated phenyl group having a carbon number of 14 or more and 30 or less;
X is O or COO;
AO is an alkyleneoxy group having a carbon number of 2 or more and 4 or less;
n represents an average number of AO moles added and is 1 or more and 200 or less; and
Y is a hydrogen atom or an alkyl group having a carbon number of 1 or more and 4 or less.

Furthermore, the present invention relates to a hydraulic composition, which contains:
a hydraulic powder; water; (A) a polymer compound having a naphthalene ring-containing monomer unit; and (B) one or more compounds represented by the following general formula (B1), wherein a molar ratio of a total amount of (B) to the naphthalene ring-containing monomer unit in (A) is 3% or more and 16% or less, $$R\text{—}X\text{-}(AO)_n\text{—}Y \qquad (B1)$$

wherein:
R is an alkyl group having a carbon number of 10 or more and 22 or less, an alkenyl group having a carbon number of 10 or more and 22 or less, a benzyl phenyl group having a carbon number of 13 or more and 27 or less, or a styrenated phenyl group having a carbon number of 14 or more and 30 or less;
X is O or COO;
AO is an alkyleneoxy group having a carbon number of 2 or more and 4 or less;
n represents an average number of AO moles added and is 1 or more and 200 or less; and
Y is a hydrogen atom or an alkyl group having a carbon number of 1 or more and 4 or less.

Furthermore, the present invention relates to a method for manufacturing a dispersant composition for a hydraulic composition, wherein the dispersant composition contains: (A) a polymer compound having a naphthalene ring-containing monomer unit; and (B) one or more compounds represented by the following general formula (B1), wherein the method includes mixing (A) and (B) so that a molar ratio of a total amount of (B) to the naphthalene ring-containing monomer unit in (A) is 3% or more and 16% or less, $$R\text{—}X\text{-}(AO)_n\text{—}Y \qquad (B1)$$

wherein:
R is an alkyl group having a carbon number of 10 or more and 22 or less, an alkenyl group having a carbon number of 10 or more and 22 or less, a benzyl phenyl group having a carbon number of 13 or more and 27 or less, or a styrenated phenyl group having a carbon number of 14 or more and 30 or less;

X is O or COO;

AO is an alkyleneoxy group having a carbon number of 2 or more and 4 or less;

n represents an average number of AO moles added and is 1 or more and 200 or less; and Y is a hydrogen atom or an alkyl group having a carbon number of 1 or more and 4 or less.

Further, the present invention relates to a method for manufacturing a hydraulic composition, the method including mixing a hydraulic powder, water, (A) a polymer compound having a naphthalene ring-containing monomer unit, and (B) one or more compounds represented by the following general formula (B1), wherein (B) is mixed so that a molar ratio of a total amount of (B) to the naphthalene ring-containing monomer unit in (A) is 3% or more and 16% or less,

R—X-(AO)$_n$—Y      (B1)

wherein:

R is an alkyl group having a carbon number of 10 or more and 22 or less, an alkenyl group having a carbon number of 10 or more and 22 or less, a benzyl phenyl group having a carbon number of 13 or more and 27 or less, or a styrenated phenyl group having a carbon number of 14 or more and 30 or less;

X is O or COO;

AO is an alkyleneoxy group having a carbon number of 2 or more and 4 or less;

n represents an average number of AO moles added and is 1 or more and 200 or less; and Y is a hydrogen atom or an alkyl group having a carbon number of 1 or more and 4 or less.

Furthermore, the present invention relates to, in preparing a hydraulic composition by mixing a hydraulic powder, water, and (A) a polymer compound having a naphthalene ring-containing monomer unit, a method for improving dispersing performance of (A) for the hydraulic powder, wherein the method includes adding (B) one or more compounds represented by the following general formula (B1) so that a molar ratio of a total amount of (B) to the naphthalene ring-containing monomer unit in (A) is 3% or more and 16% or less,

R—X-(AO)$_n$—Y      (B1)

wherein:

R is an alkyl group having a carbon number of 10 or more and 22 or less, an alkenyl group having a carbon number of 10 or more and 22 or less, a benzyl phenyl group having a carbon number of 13 or more and 27 or less, or a styrenated phenyl group having a carbon number of 14 or more and 30 or less;

X is O or COO;

AO is an alkyleneoxy group having a carbon number of 2 or more and 4 or less;

n represents an average number of AO moles added and is 1 or more and 200 or less; and Y is a hydrogen atom or an alkyl group having a carbon number of 1 or more and 4 or less.

Further, the present invention relates to a dispersant composition for an inorganic powder, wherein the dispersant composition contains: (A) a polymer compound having a naphthalene ring-containing monomer unit; and (B) one or more compounds represented by the following general formula (B1), wherein a molar ratio of a total amount of (B) to the naphthalene ring-containing monomer unit in (A) is 3% or more and 16% or less,

R—X-(AO)$_n$—Y      (B1)

wherein:

R is an alkyl group having a carbon number of 10 or more and 22 or less, an alkenyl group having a carbon number of 10 or more and 22 or less, a benzyl phenyl group having a carbon number of 13 or more and 27 or less, or a styrenated phenyl group having a carbon number of 14 or more and 30 or less;

X is O or COO;

AO is an alkyleneoxy group having a carbon number of 2 or more and 4 or less;

n represents an average number of AO moles added and is 1 or more and 200 or less; and Y is a hydrogen atom or an alkyl group having a carbon number of 1 or more and 4 or less.

Hereinafter, (A) a polymer compound having a naphthalene ring-containing monomer unit is referred to as component (A); and (B) a compound represented by the following general formula (B1) is referred to as component (B).

According the present invention, a dispersant composition for a hydraulic composition is provided, so that a hydraulic composition with excellent fluidity is obtained.

EMBODIMENTS OF THE INVENTION

[Dispersant Composition for Hydraulic Composition]

A mechanism for exhibiting effects of the present invention is unknown, but assumed as follows.

It is believed that a naphthalene ring contained in component (A), and an alkyl group or alkenyl group, a benzyl phenyl group, or a styrenated phenyl group contained in component (B) have a molecular structure with high hydrophobicity. Then, it is believed that the naphthalene ring contained in component (A) is associated with an alkyl group or alkenyl group, a benzyl phenyl group, or a styrenated phenyl group contained in component (B) due to a hydrophobic interaction, and thereby components (A) and (B) form a pseudo associate. It is inferred that when a molar ratio of a total amount of component (B) is 3% or more and 16% or less relative to the naphthalene ring-containing monomer unit in component (A), the steric repulsive force that cannot be obtained only by component (A) and the adsorbing power to a hydraulic powder that cannot be obtained only by component (B) are exhibited in a balanced manner, thereby improving the fluidity of a hydraulic composition.

<Component (A)>

Component (A) is a polymer compound having a naphthalene ring-containing monomer unit. Component (A) can be used as a dispersant for a hydraulic composition containing a hydraulic powder such as cement or gypsum.

Preferred examples of the component (A) include formaldehyde naphthalenesulfonate condensates or salts thereof. Formaldehyde naphthalenesulfonate condensates or salts thereof are a condensate of naphthalenesulfonic acid and formaldehyde or salts thereof. A formaldehyde naphthalenesulfonate condensate may be co-condensated with an aromatic compound capable of co-condensating with a naphthalenesulfonate, as a monomer, for example, methylnaphthalene, ethylnaphthalene, butylnaphthalene, hydroxynaphthalene, naphthalene carboxylic acid, anthracene, phenol, cresol, creosote oil, tar, melamine, urea, sulfanilic acid and/or derivatives thereof as long as it does not impair the performance.

Examples of formaldehyde naphthalenesulfonate condensates or salts thereof to be used include commercially available products such as Mighty 150, Demol N, Demol RN, Demol MS, Demol SN-B, and Demol SS-L (all manufactured by Kao Corporation); and Cellflow 120, Lavelin FD-40, and Lavelin FM-45 (all manufactured by DKS Co., Ltd.).

The formaldehyde naphthalenesulfonate condensate or the salt thereof has, from the viewpoint of fluidity enhancement of a hydraulic composition, a weight average molecular weight of preferably 200,000 or less, more preferably 100,000 or less, further preferably 80,000 or less, further more preferably 50,000 or less, and further more preferably 30,000 or less. The formaldehyde naphthalenesulfonate condensate or the salt thereof has, from the viewpoint of fluidity enhancement of a hydraulic composition, a weight average molecular weight of preferably 1,000 or more, more preferably 3,000 or more, further preferably 4,000 or more, and further more preferably 5,000 or more. The formaldehyde naphthalenesulfonate condensate may be in an acidic state or a neutralized product.

The molecular weight of a formaldehyde naphthalenesulfonate condensate or a salt thereof can be measured using a gel permeation chromatography under the following conditions.

[GPC Condition]
Column: G4000SWXL+G2000SWXL (Tosoh Corporation)
Eluent: 30 mM $CH_3COONa/CH_3CN=6/4$
Flow rate: 0.7 ml/min
Detection: UV 280 nm
Sample size: 0.2 mg/ml
Standard substance: in terms of sodium polystyrene sulfonate (monodispersed sodium polystyrene sulfonate: molecular weight, 206, 1800, 4000, 8000, 18000, 35000, 88000, 780000) manufactured by Nishio Kogyo Kabushiki Kaisha
Detector: UV-8020 (Tosoh Corporation)

A method for manufacturing a formaldehyde naphthalenesulfonate condensate or a salt thereof includes, for example, a method for obtaining a condensate by condensation reaction of a naphthalenesulfonate with formaldehyde. The condensate may be neutralized. Further, a water insoluble substance generated as a by-product of neutralization may be removed. Specifically, in order to obtain a naphthalenesulfonate, 1.2 to 1.4 mol of sulfuric acid is used relative to 1 mol of naphthalene and reacted with each other for 2 to 5 hours at 150° C. to 165° C., so that a sulfonated product is obtained. Next, formalin is added dropwise at 85° C. to 95° C. for 3 to 6 hours to provide 0.95 to 0.99 mol of formaldehyde relative to 1 mol of the sulfonated product, and condensation reaction is conducted at 95° C. to 105° C. after the dropwise addition. Further, due to an aqueous solution of the obtained condensate having a high acidity, from the viewpoint of preventing metallic corrosion of a storage tank or the like, water and a neutralizer are added to the obtained condensate and they may be subjected to neutralizing process at 80° C. to 95° C. It is preferred that the 1.0 to 1.1 molar equivalent of neutralizer be added to the naphthalenesulfonate and unreacted sulfuric acid. Further, as a method for removing a water insoluble product generated by neutralization, separation by filtration is preferred. Through these processes, an aqueous solution of a water soluble salt of formaldehyde naphthalenesulfonate condensate is obtained. This aqueous solution can be used as-is as an aqueous solution of component (A). Further, if needed, the aqueous solution is dried and powdered, and a powdered salt of formaldehyde naphthalenesulfonate condensate can be obtained, and this may be used as component (A). Drying and reduction to powder can be conducted by spray drying, drum drying, freeze-drying or the like.

The dispersant composition for a hydraulic composition of the present application contains component (A) in solid content in an amount of preferably 30 mass % or more, more preferably 40 mass % or more, and further preferably 50 mass % or more; and preferably 99 mass % or less, more preferably 97 mass % or less, further preferably 95 mass % or less, and further more preferably 80 mass % or less.

Note that regarding the dispersant composition for a hydraulic composition, the solid content refers to components other than water.

<Component (B)>

Component (B) is a compound represented by the general formula (B1). One or more compounds presented by the general formula (B1) will be used.

R is an alkyl group, an alkenyl group, a benzyl phenyl group or a styrenated phenyl group having a predetermined carbon number.

For an alky group or an alkenyl group, respectively, the carbon number of R in the general formula (B1) is 10 or more to 22 or less, and from the viewpoint of the fluidity improvement, preferably 10 or more, and more preferably 12 or more; and preferably 20 or less, and more preferably 18 or less.

For a benzyl phenyl group, the carbon number of R in the general formula (B1) is 13 or more and 27 or less, and preferably 20 or more from the viewpoint of the fluidity improvement.

For a styrenated phenyl group, the carbon number of R in the general formula (B1) is 14 or more and 30 or less, and preferably 22 or more from the viewpoint of the fluidity improvement.

In the case of a mixture, regarding the carbon number of R in the general formula (B1), the average carbon number is within the above ranges. The average number of benzyl groups added can be derived by use of a common analytical device. For example, it may be made by gas chromatography after hydrolysis, or may be from a nuclear magnetic resonance spectrum analysis.

Among Rs, the alkyl or alkenyl group is, from the viewpoint of the fluidity improvement, preferably an aliphatic alkyl group or an aliphatic alkenyl group, more preferably a liner aliphatic alkyl group or a linear aliphatic alkenyl group, and further preferably a linear primary aliphatic alkyl group or a linear primary aliphatic alkenyl group. The term "primary" used herein for an alkyl group or an alkenyl group means that, among carbon atoms of R, a carbon atom to be coupled to X is a primary carbon atom.

Specific examples of the alkyl or alkenyl group among Rs include a decyl group, a lauryl group, a myristyl group, a palmityl group, a stearyl group, a behenyl group, an isostearyl group, and an oleyl group; from the viewpoint of the fluidity improvement, preferably a lauryl group, a myristyl group, a palmityl group, a stearyl group, a behenyl group, an isostearyl group, and an oleyl group; and more preferably a lauryl group, a myristyl group, a palmityl group, a stearyl group, and an oleyl group.

Further, as R in the general formula (B1), a benzyl phenyl group or a styrenated phenyl group is used. A benzyl phenyl group is a phenyl group substituted by one or more benzyl groups. A styrenated phenyl group is a phenyl group having one or more styrene attached thereto. Styrene may be attached at either of the α and β positions to a phenyl group.

As a benzyl phenyl group for R, exemplified is a group selected from a monobenzyl phenyl group, a dibenzyl phenyl group, and a tribenzyl phenyl group. A benzyl phenyl group for R is preferably a tribenzyl phenyl group.

As a styrenated phenyl group for R, exemplified is a group selected from a monostyrenated phenyl group, a distyrenated phenyl group and a tristyrenated phenyl group. A styrenated phenyl group for R is preferably a distyrenated phenyl group.

From an economic viewpoint, R is preferably an alkyl group or a styrenated phenyl group.

From the viewpoint of the easy solubility in water, R is preferably an alkenyl group, a benzyl phenyl group or a styrenated phenyl group.

From the viewpoint of the low foaming property, R is preferably a benzyl phenyl group or a styrenated phenyl group.

In the general formula (B1), X is O or COO, preferably O.

In the general formula (B1), AO is an alkyleneoxy group having a carbon number of 2 or more and 4 or less, preferably an alkyleneoxy group having a carbon number of 2 or more and 3 or less. AO preferably includes an alkyleneoxy group having 2 carbon atoms.

In the general formula (B1), n represents an average number of AO moles added and is 1 or more and 200 or less from the viewpoint of the cement dispersibility. From the viewpoint of the fluidity improvement, n is preferably 9 or more, more preferably 10 or more, further preferably 20 or more, further more preferably 30 or more, further more preferably 40 or more, and further more preferably 50 or more; and from the viewpoint of a higher likelihood of interaction with component (A) and from an economic viewpoint, preferably 150 or less, and more preferably 100 or less.

In the general formula (B1), Y is a hydrogen atom or an alkyl group having a carbon number of 1 or more and 4 or less, preferably a hydrogen atom. Examples of the alkyl group include a methyl group, an ethyl group, an n-propyl group, an isopropyl group and an n-butyl group.

In the case that two or more compounds represented by the general formula (B1) are contained as component (B), n can be calculated by obtaining a product of a molar fraction of each compound in component (B) and a number of AO moles added of that compound, and summing up products for all of the compounds.

The proportion of compounds wherein R in the general formula (B1) has 18 or more carbon atoms is preferably higher in component (B) from the viewpoint of the fluidity improvement.

The proportion of compounds wherein R in the general formula (B1) has 18 or more carbon atoms in component (B) is, from the viewpoint of the fluidity improvement, preferably 50 mass % or more, more preferably 70 mass % or more, and further preferably 90 mass % or more.

The proportion of compounds wherein R in the general formula (B1) has 18 or more carbon atoms in component (B) may be 100 mass % from the viewpoint of the fluidity improvement.

The dispersant composition for a hydraulic composition of the present invention contains the component (B) in solid content in an amount of preferably 1 mass % or more, more preferably 3 mass % or more, and further preferably 5 mass % or more; and preferably 95 mass % or less, more preferably 75 mass % or less, and further preferably 50 mass % or less.

From the viewpoint of obtaining a hydraulic composition with excellent fluidity, the dispersant composition for a hydraulic composition of the present invention has a molar ratio of the total amount of component (B) to the naphthalene ring-containing monomer unit in the component (A) of 3% or more and 16% or less. From the same viewpoint, the molar ratio is preferably 4% or more, more preferably 5% or more, and further preferably 6% or more; and preferably less than 16%, more preferably 15% or less, further preferably 14% or less, further more preferably 13% or less, and further more preferably 11% or less. This molar ratio is calculated based on the total amount of the naphthalene ring-containing monomer unit in the component (A) and the total amount of the component (B). Specifically, it is calculated by the following equation.

Molar ratio (%)=[[total amount (mol) of component (B)]/[total amount (mol) of naphthalene ring-containing monomer unit in component (A)]]× 100

Further, in the case that two or more components (A) and components (B) are used, total values of their moles are used for calculation.

In the case that the component (A) is a formaldehyde naphthalenesulfonate condensate or a salt thereof, a naphthalene ring-containing monomer unit is a monomer unit formed by dehydration-condensation reaction of a naphthalenesulfonate or a salt thereof with formaldehyde. In the case that the component (A) is a sodium salt of a formaldehyde naphthalenesulfonate condensate, the total amount (mol) of naphthalene ring-containing monomer units in the compound is calculated by the following equation. In the equation, a sodium salt of a formaldehyde naphthalenesulfonate condensate is expressed as NSF.

Total amount (mol) of naphthalene ring-containing monomer units in NSF=[total amount of mass of naphthalene ring-containing monomer units in NSF]/[molecular weight of naphthalene ring-containing monomer unit in NSF]

In the case that the component (A) is a condensate of a naphthalenesulfonate or a salt thereof and formaldehyde, the total amount of mass of naphthalene ring-containing monomer units in the component (A) is a total mass of the compound.

Further, in the case that the component (A) is a condensate of a naphthalenesulfonate or a salt thereof, formaldehyde and other monomer free of a naphthalene ring, the total amount of mass of naphthalene ring-containing monomer units in the component (A) is a mass obtained by subtracting masses of monomer units derived from the naphthalene ring-free other monomer and formaldehyde from the total mass of the compound.

The mass of monomer units derived from the naphthalene ring-free other monomers may be calculated from a fed amount at the time of synthesis, or may be calculated by use of a common analytical device such as a nuclear magnetic resonance spectroscope, which can determine a copolymerization mass ratio.

Further, in the case that the component (A) is a sodium salt of a formaldehyde naphthalenesulfonate condensate, the molecular weight of the naphthalene ring-containing monomer unit in the component (A) is determined as a numeral value obtained by subtracting water (18.0) or a by-product of condensation reaction from the sum of the molecular weight (230.2) of sodium naphthalenesulfonate and the molecular weight (30.0) of formaldehyde, that is 242.2.

Further, the molecular weight of the component (B) may be determined from the total sum of atomic weights forming a molecule, or may be calculated by use of software, for example, ChemBioDraw (manufactured by PerkinElmer).

In the dispersant composition for a hydraulic composition of the present invention, in the case that, for example, the component (A) is a sodium salt of a formaldehyde naphthalenesulfonate condensate and the component (B) is a polyoxyethylene alkyl ether, the molar ratio of the total amount of the component (B) to the naphthalene ring-containing monomer unit in the component (A) can be determined by: separating the component (A) from the component (B) by a common method such as a reprecipitation method or a liquid separation method; and measuring a mass ratio for calculation.

Further, the structures of the components (A) and (B) in the dispersant composition for a hydraulic composition may be analyzed by: separating the component (A) from the component (B) by a common method such as a reprecipitation method or a liquid separation method; and analyzing by use of a common analytical apparatus such as a nuclear magnetic resonance spectroscope or a liquid chromatograph.

For the dispersant composition for a hydraulic composition of the present invention, it is essentially preferred that a ratio between the naphthalene ring-containing monomer unit in the component (A) and the component (B) be determined by a molar ratio therebetween, but it may be determined by defining, for example, a mass ratio as described below.

From the viewpoint of the fluidity improvement, the dispersant composition for a hydraulic composition of the present invention has a mass ratio between the components (A) and (B), (A)/(B), of preferably 0.15 or more, more preferably 0.7 or more, and further preferably 0.9 or more; and preferably 17 or less, more preferably 8.0 or less, further preferably 6.0 or less, further more preferably 4.0 or less, and further more preferably 2.0 or less.

<Other Components>

The dispersant composition for a hydraulic composition of the present invention may further contain (C) an antifoaming agent (hereinafter, referred to as component (C)).

As the component (C), exemplified are one or more antifoaming agents selected from a silicone-based antifoaming agent, a fatty acid ester-based antifoaming agent, an ether-based antifoaming agent, a polyalkylene oxide-based antifoaming agent, an alkyl phosphoric ester-based antifoaming agent and an acetylene glycol-based antifoaming agent.

As the component (C), preferred is one or more antifoaming agent selected from a silicone-based antifoaming agent, a fatty acid ester-based antifoaming agent and an ether-based antifoaming agent.

The silicone-based antifoaming agent is preferably dimethyl polysiloxane.

The fatty acid ester-based antifoaming agent is preferably a water-insoluble polyalkylene glycol fatty acid ester.

The ether-based antifoaming agent is preferably polyalkylene glycol alkyl ether.

The polyalkylene oxide-based antifoaming agent is preferably a block copolymer of ethylene oxide and propylene oxide.

The alkyl phosphoric ester-based antifoaming agent is preferably tributyl phosphate, isotributyl phosphate, or sodium octyl phosphate.

The acetylene glycol-based antifoaming agent is preferably 2,4,7,9-tetramethyl-5-decyne-4,7-diol or an alkyleneoxide adduct thereof.

As the component (C), a fatty acid ester-based antifoaming agent is preferred from the viewpoint of preventing strength reduction.

The silicone-based antifoaming agent is preferably in an emulsion form compatible with water. Examples of the emulsion form compatible with water include commercial products such as KM-70, KM-73A (both available from Sin-Etsu Chemical Co., Ltd.), TSA series (Momentive Performance Materials Japan Inc.), FS anti-foam series (Dow Corning Toray Co., Ltd.), and Anti-foam E-20 (Kao Corporation).

Examples of the fatty acid ester-based antifoaming agent include commercial products of polyalkylene glycol fatty acid ester such as Rheodol TW-L120 (Kao Corporation), Nicofix and Foamlex (both from Nicca Chemical Co., Ltd.).

Examples of the ether-based antifoaming agent include commercial products of polyalkylene glycol alkyl ether such as Defoamer No. 1, Defoamer No. 5, Defoamer No. 8 (all available from Kao Corporation), SN defoamer 15-P, and Foamaster PC (both available from San Nopco Limited).

Examples of the polyalkylene oxide-based antifoaming agent include commercial product of a polyethyleneoxide polypropylene oxide block copolymer such as a block copolymer of ethyleneoxide and propyleneoxide, for example PLURONIC™ products (BASF).

As a commercial product of the acetylene glycol-based antifoaming agent, exemplified are SURFYNOL™ 400 series (Air Products and Chemicals, Inc.) and others.

The dispersant composition for a hydraulic composition of the present invention contains the component (C) in solid content in an amount of preferably 0.001 mass % or more, more preferably 0.01 mass % or more, and further preferably 0.1 mass % or more; and preferably 10 mass % or less, more preferably 5 mass % or less and further preferably 1 mass % or less.

From the viewpoint of the foaming prevention and foam breaking, the dispersant composition for a hydraulic composition of the present invention has a mass ratio between the components (B) and (C), (C)/(B), of preferably 0.00001 or more, more preferably 0.00005 or more, and further preferably 0.0001 or more; and preferably 0.5 or less, more preferably 0.1 or less, and further preferably 0.05 or less.

In general, when a compound having good foaming property is added to a hydraulic composition such as concrete, it entrains foam into the composition and sometimes improves the fluidity like an AE water reducing agent described in JIS A-6204. Meanwhile, an antifoaming agent can generally break foam taken into a hydraulic composition such as concrete, so this reduces a void in a hardened product of the hydraulic composition, thereby preventing reduction of strength. Therefore, it is considered that a combined use of a compound with good foaming property like the compound (B) and an antifoaming agent is preferred from the viewpoint of preventing strength reduction, but not preferred from the viewpoint of improving the fluidity. However, in the present invention, even when an antifoaming agent is used, the hardening strength can be improved while the fluidity of a hydraulic composition is kept, and therefore an effect different from the improvement of fluidity caused by foam can be obtained.

The dispersant composition for a hydraulic composition of the present invention may contain a component such as a conventional cement dispersant, a water-soluble polymer compound, an air entraining agent, a cement wetting agent, an expansive material, a waterproofing agent, a retarder, a set accelerating agent, a viscous agent, a coagulant, a drying shrinkage reducing agent, a strength enhancement agent, a hardening accelerator, and an antiseptic agent (excluding those corresponding to the components (A) to (C)).

The dispersant composition for a hydraulic composition of the present invention may be in the form of either of a liquid and a solid. In the case that the dispersant composition for a hydraulic composition of the present invention is in the form of a liquid, it preferably contains water.

When the dispersant composition for a hydraulic composition is in the form of a liquid containing water, the content of the water in the composition is, from the viewpoint of workability at the time of preparing the hydraulic composition, preferably 10 mass % or more, more preferably 30 mass % or more, and further preferably 50 mass % or more; and from the viewpoint of the fluidity of a hydraulic composition, preferably 90 mass % or less, and more preferably 70 mass % or less.

When the dispersant composition for a hydraulic composition is in the form of a liquid containing water, the content of component (A) in the composition is, from the viewpoint of improving the fluidity of the hydraulic composition, preferably 13 mass %, or more, more preferably 15 mass % or more, and further preferably 17 mass % or more; and preferably 84 mass % or less, more preferably 79 mass % or less, and further preferably 74 mass % or less.

When the dispersant composition for a hydraulic composition is in the form of a liquid containing water, the content of the component (B) in the composition is, from the viewpoint of improving the fluidity of the hydraulic composition, preferably 6 mass % or more, more preferably 11 mass % or more, and further preferably 16 mass % or more; and preferably 77 mass % or less, more preferably 75 mass % or less, and further preferably 73 mass % or less.

When the dispersant composition for a hydraulic composition is in the form of a liquid containing water, the total content of the components (A) and (B) in the composition is, from the viewpoint of improving the fluidity of the hydraulic composition, preferably 10 mass % or more, and more preferably 30 mass % or more; and preferably 90 mass % or less, more preferably 70 mass % less, and further preferably 50 mass % or less.

[Dispersant Composition for an Inorganic Powder]

Specific examples and preferred embodiments of components (A) and (B) used in a dispersant composition for an inorganic powder of the present invention are the same as those mentioned for the dispersant composition for a hydraulic composition of the present invention.

Further, in the dispersant composition for an inorganic powder of the present invention, a molar ratio of a total amount of the component (B) to the naphthalene ring-containing monomer unit in the component (A) is 3% or more and 16% or less. Preferred range of this molar ratio is the same as that of the dispersant composition for a hydraulic composition of the present invention.

The dispersant composition for an inorganic powder of the present invention may contain the component (C). Specific examples and preferred embodiments of component (C) are the same as those mentioned for the dispersant composition for a hydraulic composition of the present invention.

The inorganic powder is not particularly limited, but examples thereof are listed below. Those used for hydraulic powders among inorganic powders are the dispersant composition for a hydraulic composition of the present invention.
(1) hydraulic powders such as cement and gypsum
(2) powders having a pozzolanic action such as fly ash, silica fume, volcanic ash, and silicate clay
(3) potential hydraulic powders such as coal ash, blast-furnace slag and diatomaceous earth
(4) silicates such as kaolin, aluminum silicate, clay, talc, mica, calcium silicate, sericite, and bentonite
(5) carbonates such as calcium carbonate, magnesium carbonate, barium carbonate, and basic lead carbonate
(6) sulfates such as calcium sulfate and barium sulfate
(7) chromates such as strontium chromate and pigment yellow
(8) molybdates such as zinc molybdate, calcium-zinc molybdate, and magnesium molybdate
(9) metallic oxides such as alumina, antimony oxide, titanium oxide, cobalt oxide, triiron tetraoxide, diiron trioxide, trilead tetroxide, lead monoxide, chrome oxide green, tungsten trioxide, and yttrium oxide
(10) metallic hydroxides such as aluminum hydroxide, magnesium hydroxide, calcium hydroxide, iron hydroxide, and metatitanic acid
(11) metallic carbides such as silicon carbide, tungsten carbide, boron carbide and titanium carbide
(12) other inorganic powders not classified in the above (1) to (11), such as aluminum nitride, silicon nitride, boron nitride, zirconia, barium titanate, satin white, carbon black, graphite, chrome yellow, mercury sulfide, ultramarine, Paris blue, titanium yellow, chrome vermilion, lithopone, copper acetoarsenite, nickel, silver, palladium, and lead zirconate titanate The dispersant composition for an inorganic powder of the present invention may be used for an inorganic powder slurry. The inorganic powder slurry is a slurry, which contains an inorganic powder, water, component (A) and component (B), wherein a molar ratio of a total amount of the component (B) to a naphthalene ring-containing monomer unit in the component (A) is 3% or more and 16% or less. When the inorganic powder is a hydraulic powder, a slurry is a hydraulic composition of the present invention.

Specific examples and preferred embodiments of the components (A) and (B) used for the inorganic powder slurry of the present invention are the same as those mentioned for the dispersant composition for a hydraulic composition of the present invention. Further, in the inorganic powder slurry of the present invention, a molar ratio of a total amount of the component (B) to a naphthalene ring-containing monomer unit in the component (A) is 3% or more and 16% or less. Preferred range of this molar ratio is the same as that for the dispersant composition for a hydraulic composition of the present invention.

As the inorganic powder slurry, exemplified is a slurry using, for example, blast furnace slag as an inorganic powder (hereinafter, referred to as blast furnace slag slurry). The blast furnace slag slurry preferably contains the dispersant composition for an inorganic powder of the present invention in solid content in an amount of from 0.01 parts by mass to 5.0 parts by mass relative to 100 parts by mass of blast furnace slag. The blast furnace slag slurry contains water in an amount of preferably 40 parts by mass or more, more preferably 45 parts by mass or more; and preferably 250 parts by mass, and more preferably 230 parts by mass or less, relative to 100 parts by mass of blast furnace slag. Further, the blast furnace slag slurry preferably contains component (C). The blast furnace slag slurry has a mass ratio of components (B) and (C), (C)/(B), of preferably 0.00001 or more, more preferably 0.00005 or more, and further preferably 0.0001 or more; and preferably 0.5 or less, more preferably 0.1 or less, and further preferably 0.05 or less.

[Hydraulic Composition]

The present invention provides a hydraulic composition, which contains a hydraulic powder, water, component (A) and one or more components (B), wherein a molar ratio of a total amount of the components (B) to a naphthalene ring-containing monomer unit in the component (A) is 3% or more and 16% or less.

The hydraulic powder used for the hydraulic composition of the present invention is a powder having a property, which enables the powder to be hardened by hydration, and examples thereof include cement and gypsum. The hydraulic powder is preferably cement such as ordinary portland cement, belite cement, moderate heat cement, early strength cement, ultra early strength cement, and sulfate resisting cement. Further, it may be blast furnace slag cement, fly ash cement, silica fume cement or the like, which contains, in addition to the above-mentioned cement, a powder having a pozzolanic action and/or potential hydraulicity such as blast furnace slag, fly ash and silica fume, or stone powder (calcium carbonate powder).

The hydraulic composition of the present invention has a water/hydraulic powder ratio (mass percentage (mass %) of water and hydraulic powder in a slurry, usually abbreviated as W/P, but when the powder is cement, abbreviated as W/C) of preferably 15 mass % or more, and more preferably 20 mass % or more; and preferably 50 mass % or less, and more preferably 45 mass % or less, in terms of exhibiting the fluidity even with a small amount of water mixed.

Specific examples and preferred embodiments of the components (A) and (B) used in the hydraulic composition of the present invention are the same as those mentioned for the dispersant composition for a hydraulic composition of the present invention.

Further, in the hydraulic composition of the present invention, a molar ratio of a total amount of the component (B) to a naphthalene ring-containing monomer unit in the component (A) is 3% or more and 16% or less. Preferred range of this molar ratio is the same as that for the dispersant composition for a hydraulic composition of the present invention.

The hydraulic composition of the present invention contains the component (A) in an amount of preferably 0.01 parts by mass or more, more preferably 0.05 parts by mass or more, further preferably 0.1 parts by mass or more, further more preferably 0.15 parts by mass or more, and further more preferably 0.22 parts by mass or more; and preferably 2 parts by mass or less, more preferably 1.5 parts by mass or less, further preferably 1.0 part by mass or less, further more preferably 0.50 parts by mass or less, further more preferably 0.40 parts by mass, and further more preferably 0.30 parts by mass or less, relative to 100 parts by mass of the hydraulic powder.

The hydraulic composition of the present invention contains the component (B) in an amount of preferably 0.001 parts by mass or more, more preferably 0.005 parts by mass or more, further preferably 0.01 parts by mass or more, further more preferably 0.04 parts by mass or more, further more preferably 0.10 parts by mass or more, and further more preferably 0.20 parts by mass or more; and preferably 2.0 parts by mass or less, more preferably 1.5 parts by mass or less, further preferably 1.0 part by mass or less, further more preferably 0.40 parts by mass or less, further more preferably 0.35 parts by mass or less, and further more preferably 0.28 parts by mass or less, relative to 100 parts by mass of the hydraulic powder.

The hydraulic composition of the present invention contains the components (A) and (B) in total in an amount of preferably 0.01 parts by mass or more, more preferably 0.05 parts by mass or more, further preferably 0.1 parts by mass or more, and further more preferably 0.2 parts by mass or more; and preferably 4 parts by mass or less, more preferably 3.0 parts by mass or less, further preferably 2.0 parts by mass or less, and further more preferably 0.9 parts by mass or less, relative to 100 parts by mass of the hydraulic powder.

The hydraulic composition of the present invention may contain an antifoaming agent as the component (C). Specific examples and preferred embodiments of the antifoaming are the same as those described for the dispersant composition for a hydraulic composition of the present invention. When the component (C) is used, the hydraulic composition of the present invention contains the component (C) in an amount of preferably 0.00005 parts by mass or more, more preferably 0.00025 parts by mass or more, and further preferably 0.0005 parts by mass or more; and preferably 0.1 parts by mass or less, more preferably 0.075 parts by mass or less, and further preferably 0.05 parts by mass or less, relative to 100 parts by mass of the hydraulic powder.

From the viewpoint of the foaming prevention and foam breaking, the hydraulic composition of the present invention has a mass ratio between the components (B) and (C), (C)/(B), of preferably 0.00001 or more, more preferably 0.00005 or more, and further preferably 0.0001 or more; and preferably 0.5 or less, more preferably 0.1 or less, and further preferably 0.05 or less.

The hydraulic composition of the present invention preferably contains an aggregate. Examples of the aggregate include aggregates selected from fine aggregates and coarse aggregates. As the fine aggregate, those defined in No. 2311 of JIS A0203-2014 are exemplified. Examples of the fine aggregate include river sand, land sand, pit sand, sea sand, lime sand, silica sand and crushed sand thereof, blast furnace slag fine aggregate, ferronickel slag fine aggregate, light-weight fine aggregate (artificial and natural), and recycled fine aggregate. Further, as the coarse aggregate, those defined in No. 2312 of JIS A0203-2014 are exemplified. Examples of the coarse aggregate include river gravel, land gravel, pit gravel, sea gravel, lime gravel, crushed stone thereof, blast furnace slag coarse aggregate, ferronickel slag coarse aggregate, light-weight coarse aggregate (artificial and natural), and recycled coarse aggregate. Different types of fine aggregate and coarse aggregate may be mixed and used, or a single type thereof may be used.

In the case that the hydraulic composition is concrete, the bulk volume pertaining to the amount of coarse aggregate to be used is preferably 50% or more, more preferably 55% or more, and further preferably 60% or more; and preferably 100% or less, more preferably 90% or less, and further preferably 80% or less, from the viewpoint of exhibiting the strength of the hydraulic composition, reducing the amount of the hydraulic powder to be used such as cement, and improving the filling property into forms and the like. The bulk volume is a ratio of volume (including voids) of coarse aggregate in 1 $m^3$ of concrete.

Further, in the case that the hydraulic composition is concrete, the amount of fine aggregate to be used is preferably 500 $kg/m^3$ or more, more preferably 600 $kg/m^3$ or more, and further preferably 700 $kg/m^3$; and preferably 1000 $kg/m^3$ or less, and more preferably 900 $kg/m^3$, from the viewpoint of improving the filling property into forms and the like.

In the case that the hydraulic composition is mortar, the amount of fine aggregate to be used is preferably 800 $kg/m^3$ or more, more preferably 900 $kg/m^3$ or more, and further preferably 1000 $kg/m^3$ or more; and preferably 2000 $kg/m^3$ or less, more preferably 1800 $kg/m^3$ or less, and further preferably 1700 $kg/m^3$ or less.

As the hydraulic composition, concrete and the like are exemplified. Especially, concrete using cement is preferred. The hydraulic composition of the present invention is useful in any field for self-leveling, refractories, plaster, light-weight or heavy-weight concrete, AE, repairing, prepacking, tremies, foundation improvement, grout and cold weather.

The hydraulic composition of the present invention may further contain other component. Examples thereof include an AE agent, a retarder, a foaming agent, a viscous agent, a blowing agent, a waterproofing agent, and a fluidizing agent.

[Method for Manufacturing a Dispersant Composition for a Hydraulic Composition]

The present invention provides a method for manufacturing a dispersant composition for a hydraulic composition containing components (A) and (B), wherein the method includes mixing component (A) and one or more components (B) so that a molar ratio of a total amount of the component (B) to the naphthalene ring-containing monomer unit in the component (A) is 3% or more and 16% or less.

Specific examples and preferred embodiments of the components (A) and (B) used for the method of the present invention for manufacturing a dispersant composition for a hydraulic composition are the same as those described for the dispersant composition for a hydraulic composition of the present invention. Further, a dispersant composition for a hydraulic composition containing components (A), (B), and (C) may be manufactured by mixing the component (A), the one or more components (B) and the component (C). Specific examples and preferred embodiments of the component (C) are the same as those described for the dispersant composition for a hydraulic composition of the present invention.

Further, the matters described for the dispersant composition for a hydraulic composition of the present invention are appropriately applicable to the method for manufacturing a dispersant composition for a hydraulic composition of the present invention.

Further, in the method for manufacturing a dispersant composition for a hydraulic composition of the present invention, the components (A) and (B) are mixed so that a molar ratio of a total amount of the component (B) to the naphthalene ring-containing monomer unit in the component (A) is 3% or more and 16% or less. Preferred range of this molar ratio is the same as that for the dispersant composition for a hydraulic composition of the present invention.

The method of the present invention for manufacturing a dispersant composition for a hydraulic composition is suitable as a method for manufacturing a dispersant composition for a hydraulic composition of the present invention.

As the method of the present invention for manufacturing a dispersant composition for a hydraulic composition, exemplified is a method for manufacturing a dispersant composition for a hydraulic composition, which contains component (A), one or more components (B) and water. In this case, mixing with the components (A) and (B) and water may be conducted by any method as long as the performance is not reduced. Usable are, for example, a method of mixing an aqueous solution of the component (A) heated to a freezing point or higher of the component (B) with the component (B) by a stirrer, and a method of dissolving the components (A) and (B) in water, respectively, and mixing an aqueous solution of the component (A) with an aqueous solution of the component (B).

[Method for Manufacturing a Hydraulic Composition]

The present invention provides a method for manufacturing a hydraulic composition, which includes mixing a hydraulic powder, water, component (A) and one or more components (B), wherein the components (B) is mixed so that a molar ratio of a total amount of the components (B) to a naphthalene ring-containing monomer unit in the component (A) is 3% or more and 16% or less.

Specific examples and preferred embodiments of the components (A) and (B) used for the method for manufacturing a hydraulic composition of the present invention are, respectively, the same as those described for the dispersant composition for a hydraulic composition of the present invention.

Also, specific examples and preferred embodiment for the hydraulic powder used for the method for manufacturing a hydraulic composition of the present invention are the same as those described for the hydraulic composition of the present invention.

Further, a dispersant composition for a hydraulic composition of the present invention containing a hydraulic powder, water, component (A), component (B) and component (C) can be manufactured by mixing the hydraulic powder, water, the component (A), the one or more components (B) and the component (C). Specific examples and preferred embodiments of the component (C) are the same as those described for the dispersant composition for a hydraulic composition of the present invention.

Also, the matters described for the dispersant composition for a hydraulic composition of the present invention and the hydraulic composition are appropriately applicable to the method for manufacturing a hydraulic composition of the present invention.

Further, in the method for manufacturing a hydraulic composition of the present invention, the component (B) is mixed so that a molar ratio of a total amount of the component (B) to a naphthalene ring-containing monomer unit in the component (A) is 3% or more and 16% or less. Preferred range of this molar ratio is the same as that for the dispersant composition for a hydraulic composition of the present invention.

In the method for manufacturing a hydraulic composition of the present invention, the component (A) is mixed in an amount of preferably 0.01 parts by mass or more, more preferably 0.05 parts by mass or more, further preferably 0.1 parts by mass or more, further more preferably 0.15 parts by mass or more, and further more preferably 0.22 parts by mass or more; and preferably 2 parts by mass or less, more preferably 1.5 parts by mass or less, further preferably 1 part by mass or less, further more preferably 0.50 parts by mass or less, further more preferably 0.40 parts by mass or less, and further more preferably 0.30 parts by mass or less, relative to 100 parts by mass of the hydraulic powder.

In the method for manufacturing a hydraulic composition of the present invention, the component (B) is mixed in an amount of preferably 0.001 parts by mass or more, more preferably 0.005 parts by mass or more, further preferably 0.01 parts by mass or more, further more preferably 0.04 parts by mass or more, further more preferably 0.10 parts by mass or more, further more preferably 0.04 parts by mass or more, further more preferably 0.10 parts by mass or more, and further more preferably 0.20 parts by mass or more; and preferably 2 parts by mass or less, more preferably 1.5 parts by mass or less, further preferably 1 part by mass or less, further more preferably 0.40 parts by mass or less, further more preferably 0.35 parts by mass or less, and further more preferably 0.28 parts by mass or less, relative to 100 parts by mass of the hydraulic powder.

In the method for manufacturing a hydraulic composition of the present invention, the components (A) and (B) are mixed in total in an amount of preferably 0.01 parts by mass or more, more preferably 0.05 parts by mass or more, further preferably 0.1 parts by mass or more, and further more preferably 0.2 parts by mass or more; and preferably 4 parts by mass or less, more preferably 3 parts by mass or less, further preferably 2 parts by mass or less, and further more preferably 0.9 parts by mass or less, relative to 100 parts by mass of the hydraulic powder.

In the method for manufacturing a hydraulic composition of the present invention, an antifoaming agent as the component (C) may further be mixed. Specific examples and preferred embodiments of the antifoaming agent are the same as those described for the dispersant composition for a hydraulic composition of the present invention. When the component (C) is used in the method for manufacturing a hydraulic composition of the present invention, the component (C) is mixed in an amount of preferably 0.00005 parts by mass or more, more preferably 0.00025 parts by mass or more, and further preferably 0.0005 parts by mass or more; and preferably 0.1 parts by mass or less, more preferably 0.075 parts by mass or less, and further preferably 0.05 parts by mass or less, relative to 100 parts by mass of the hydraulic powder.

In the method for manufacturing a hydraulic composition of the present invention, from the viewpoint of smoothly mixing the components (A) and (B) with a hydraulic powder such as cement, it is preferred that the components (A) and (B) be mixed with water in advance, and then mixed with the hydraulic powder. The dispersant composition for a hydraulic composition of the present invention, which contains water, can be used.

Further, in the method for manufacturing a hydraulic composition of the present invention, a method for mixing a hydraulic powder such as cement with the dispersant composition for a hydraulic composition of the present invention is preferred. The dispersant composition for a hydraulic composition of the present invention may be in the form of powder or liquid. For the dispersant composition for a hydraulic composition of the present invention, it is preferred that the components (A) and (B), and further the component (C) be added in above-described amounts relative to the hydraulic powder. Specifically, in terms of the mass parts of solid contents of the dispersant composition for a hydraulic composition of the present invention, they are mixed in an amount of preferably 0.001 parts by mass or more, more preferably 0.005 parts by mass or more, further preferably 0.01 parts by mass or more, and further more preferably 0.05 parts by mass or more; and preferably 4 parts by mass or less, more preferably 3 parts by mass or less, further preferably 2 parts by mass or less, and further more preferably 0.9 parts by mass or less, relative to 100 parts by mass of the hydraulic powder.

The hydraulic powder, water, the component (A) and the component (B) are mixed by a mixer such as a mortar mixer and a biaxial pug mill. In addition, the mixing is performed for preferably 1 minute or more, and more preferably 2 minutes or more; and preferably 5 minutes or less and more preferably 3 minutes or less. In preparing the hydraulic composition, the materials or agents, and the amounts thereof explained for the hydraulic composition are applicable.

The present invention provides a method for manufacturing a hardened product, which has:

preparing a hydraulic composition by mixing a hydraulic powder, water, component (A) and one or more components (B), wherein the component (B) is mixed so that a molar ratio of a total amount of the component (B) to a naphthalene ring-containing monomer unit in the component (A) is 3% or more and 16% or less;

filling the prepared hydraulic composition into a form and curing and hardening; and removing the hardened hydraulic composition from the form. The matters described for the dispersant composition for a hydraulic composition, the hydraulic composition, the method for manufacturing a dispersant composition for a hydraulic composition, and the method for manufacturing a hydraulic composition of the present invention are applicable to this method for manufacturing a hardened product.

Examples of the hardened product of the hydraulic composition using a form, which is a concrete product, include products for civil engineering such as various block products for revetment, box culvert products, segment products used for tunnel construction, and girder products for bridge piers; and products for architecture such as curtain wall products and building component products used for pillars, beams and floor plates.

[Method for Improving Dispersing Performance]

The present invention provides, in preparing a hydraulic composition by mixing a hydraulic powder, water and component (A), a method for improving dispersing performance of the component (A) for the hydraulic powder, wherein the method includes adding one or more components (B) so that a molar ratio of a total amount of the components (B) to a naphthalene ring-containing monomer unit in the component (A) is 3% or more and 16% or less. The component (A) is known as a dispersant for a hydraulic composition, and its dispersing performance improves the fluidity of a hydraulic composition. Then, the components (B) is used in combination at the above molar ratio, and this improves the fluidity of the hydraulic composition compared to a case where the component (A) is used alone. That is, addition of the components (B) at the molar ratio improves the dispersing performance of the component (A) for the hydraulic powder.

Specific examples and preferred embodiments of the components (A) and (B) used in the method for improving dispersing performance of the present invention are the same as those described for the dispersant composition for a hydraulic composition of the present invention.

Further, specific examples and preferred embodiments of the hydraulic powder used in the method for improving dispersing performance of the present invention are the same as those described for the hydraulic composition of the present invention.

Further, the matters described for the dispersant composition for a hydraulic composition, the hydraulic composition, the method for manufacturing a dispersant composition for a hydraulic composition, and the method for manufacturing a hydraulic composition of the present invention are appropriately applicable to the method for improving dispersing performance of the present invention.

Further, in the method for improving dispersing performance of the present invention, the component (B) is added so that a molar ratio of a total amount of the component (B) to a naphthalene ring-containing monomer unit in the component (A) is 3% or more and 16% or less. Preferred range of this molar ratio is the same as that for the dispersant composition for a hydraulic composition of the present invention.

<Embodiments of the Present Invention>

Hereinafter, embodiments of the present invention are exemplified. The matters described for a dispersant composition for a hydraulic composition, a hydraulic composition, a method for manufacturing a dispersant composition for a hydraulic composition, a method for manufacturing a hydraulic composition, and a method for improving dispersing performance according to the present invention are appropriately applied to these embodiments. In the following embodiments, (A) a polymer compound having a naphthalene ring-containing monomer unit is component (A); (B) a compound represented by the general formula (B1) is component (B); and (C) an antifoaming agent is component (C).

<1>

A dispersant composition for a hydraulic composition, containing:
(A) a polymer compound having a naphthalene ring-containing monomer unit; and
(B) one or more compounds represented by the following general formula (B1),
wherein a molar ratio of a total amount of (B) to the naphthalene ring-containing monomer unit in (A) is 3% or more and 16% or less,

$$R\text{—}X\text{-}(AO)_n\text{—}Y \tag{B1}$$

wherein:
R is an alkyl group having a carbon number of 10 or more and 22 or less, an alkenyl group having a carbon number of 10 or more and 22 or less, a benzyl phenyl group having a carbon number of 13 or more and 27 or less, or a styrenated phenyl group having a carbon number of 14 or more and 30 or less;
X is O or COO;
AO is an alkyleneoxy group having a carbon number of 2 or more and 4 or less;
n represents an average number of AO moles added and is 1 or more and 200 or less; and
Y is a hydrogen atom or an alkyl group having a carbon number of 1 or more and 4 or less.

<2>

The dispersant composition for a hydraulic composition described in the above <1>, wherein the component (A) is a formaldehyde naphthalenesulfonate condensate or a salt thereof.

<3>

The dispersant composition for a hydraulic composition described in the above <2>, wherein the component (A) has a weight average molecular weight of preferably 200,000 or less, more preferably 100,000 or less, further preferably 80,000 or less, further more preferably 50,000 or less, and further more preferably 30,000 or less.

<4>

The dispersant composition for a hydraulic composition described in the above <2> or <3>, wherein the component (A) has a weight average molecular weight of preferably 1,000 or more, more preferably 3,000 or more, further preferably 4,000 or more, and further more preferably 5,000 or more.

<5>

The dispersant composition for a hydraulic composition described in any one of the above <1> to <4>, wherein the component (A) is contained, in solid content, in an amount of preferably 30 mass % or more, more preferably 40 mass % or more, and further preferably 50 mass % or more; and preferably 99 mass % or less, more preferably 97 mass % or less, and further preferably 95 mass % or less.

<6>

The dispersant composition for a hydraulic composition described in any one of the above <1> to <5>, wherein R in the general formula (B1) of the component (B) is: an alkyl group having a carbon number of 10 or more, and preferably 12 or more, and 22 or less, preferably 20 or less, and more preferably 18 or less; an alkenyl group having a carbon number of 10 or more, preferably 12 or more, and 22 or less, preferably 20 or less, and more preferably 18 or less; a benzyl phenyl group having a carbon number of 13 or more, preferably 20 or more, and 27 or less; or a styrenated phenyl group having a carbon number of 14 or more, preferably 22 or more, and 30 or less.

<7>

The dispersant composition for a hydraulic composition described in any one of the above <1> to <6>, wherein R in the general formula (B1) of the component (B) is an alkyl group or an alkenyl group, preferably an aliphatic alkyl group or an aliphatic alkenyl group, more preferably a linear aliphatic alkyl group or a linear aliphatic alkenyl group, and further preferably a linear primary aliphatic alkyl group or a linear primary aliphatic alkenyl group.

<8>

The dispersant composition for a hydraulic composition described in any one of the above <1> to <6>, wherein R in the general formula (B1) of the component (B) is: a benzyl phenyl group or a styrenated phenyl group; preferably a group selected from a monostyrenated phenyl group, a distyrenated phenyl group, a tristyrenated phenyl group, a monobenzyl phenyl group, a dibenzyl phenyl group and a tribenzyl phenyl group; more preferably a group selected from a distyrenated phenyl group and a tribenzyl phenyl group; and further preferably a group selected from a distyrenated phenyl group and a tribenzyl phenyl group.

<9>

The dispersant composition for a hydraulic composition described in any one of the above <1> to <6>, wherein R in the general formula (B1) of the component (B) is: a group selected from a decyl group, a lauryl group, a myristyl group, a palmityl group, a stearyl group, a behenyl group, an isostearyl group, an oleyl group, a monostyrenated phenyl group, a distyrenated phenyl group, a tristyrenated phenyl group, a monobenzyl phenyl group, a dibenzyl phenyl group, and a tribenzyl phenyl group; preferably a group selected from a lauryl group, a myristyl group, a palmityl group, a stearyl group, a behenyl group, an isostearyl group, an oleyl group, a distyrenated phenyl group, and a tribenzyl phenyl group; and more preferably a lauryl group, a myristyl group, a palmityl group, a stearyl group, an oleyl group, a distyrenated phenyl group, and a tribenzyl phenyl group.

<10>

The dispersant composition for a hydraulic composition described in any one of the above <1> to <9>, wherein the component (B) is a compound, wherein X in the general formula (B1) is O.

<11>

The dispersant composition for a hydraulic composition described in any one of the above <1> to <10>, wherein the component (B) is a compound wherein AO in the general formula (B1) is an alkyleneoxy group having 2 or 3 carbon atoms, or a compound wherein AO in the general formula (B1) includes an alkyleneoxy group having 2 carbon atoms.

<12>

The dispersant composition for a hydraulic composition described in any one of the above <1> to <11>, wherein the component (B) is a compound wherein n in the general formula (B1) is 1 or more, preferably 9 or more, more preferably 10 or more, further preferably 20 or more, furthermore preferably 30 or more, further more preferably 40 or more, and further more preferably 50 or more; and 200 or less, preferably 150 or less, and further preferably 100 or less.

<13>
The dispersant composition for a hydraulic composition described in any one of the above <1> to <12>, wherein the component (B) is a compound wherein Y in the general formula (B1) is a hydrogen atom.
<14>
The dispersant composition for a hydraulic composition described in any one of the above <1> to <13>, wherein the component (B) is contained, in solid content, in an amount of preferably 1 mass % or more, more preferably 3 mass % or more, and further preferably 5 mass % or more; and preferably 70 mass % or less, more preferably 60 mass % or less, and further preferably 50 mass % or less.
<15>
The dispersant composition for a hydraulic composition described in any one of the above <1> to <14>, wherein a mass ratio between the components (A) and (B), (A)/(B), is preferably 0.8 or more, more preferably 0.9 or more, and further preferably 1.0 or more; and preferably 20 or less, more preferably 15 or less, and further preferably 10 or less.
<16>
The dispersant composition for a hydraulic composition described in any one of the above <1> to <14>, wherein a mass ratio between the components (A) and (B), (A)/(B), is preferably 0.5 or more, more preferably 0.7 or more, and further preferably 0.9 or more; and preferably 15 or less, more preferably 8.0 or less, further preferably 6.0 or less, further more preferably 4.0 or less, and further more preferably 2.0 or less.
<17>
The dispersant composition for a hydraulic composition described in any one of the above <1> to <16>, wherein a molar ratio of the total amount of the component (B) to the naphthalene ring-containing monomer unit in the component (A) is 3% or more, preferably 4% or more, more preferably 5% or more, and further preferably 6% or more; and 16% or less, preferably less than 16%, more preferably 15% or less, further preferably 14% or less, and further more preferably 13% or less, and further more preferably 11% or less.
<18>
The dispersant composition for a hydraulic composition described in any one of the above <1> to <17>, further containing (C) an antifoaming agent, preferably a fatty acid ester-based antifoaming agent.
<19>
The dispersant composition for a hydraulic composition described in the above <18>, wherein the component (C) is contained, in solid content, in an amount of preferably 0.001 mass % or more, more preferably 0.01 mass % or more, and further preferably 0.1 mass % or more; and preferably 10 mass % or less, more preferably 5 mass % or less, and further preferably 1 mass % or less.
<20>
The dispersant composition for a hydraulic composition described in the above <18> or <19>, wherein a mass ratio between the components (B) and (C), (C)/(B), is preferably 0.000001 or more, more preferably 0.00005 or more, and further preferably 0.0001 or more; and preferably 0.5 or less, more preferably 0.1 or less, and further preferably 0.05 or less.
<21>
The dispersant composition for a hydraulic composition described in any one of the above <1> to <20>, wherein the dispersant composition for a hydraulic composition contains water and the water is contained in the composition in an amount of preferably 10 mass % or more, more preferably 30 mass % or more, and further preferably 50 mass % or more; and preferably 90 mass % or less, and more preferably 70 mass % or less.
<22>
The dispersant composition for a hydraulic composition described in any one of the above <1> to <21>, wherein the dispersant composition for a hydraulic composition contains water and the component (A) is contained in the composition in an amount of preferably 13 mass % or more, more preferably 15 mass % or more, and further preferably 17 mass % or more; and preferably 84 mass % or less, more preferably 79 mass % or less, and further preferably 74 mass % or less.
<23>
The dispersant composition for a hydraulic composition described in any one of the above <1> to <22>, wherein the dispersant composition for a hydraulic composition contains water and the component (B) is contained in the composition in an amount of preferably 6 mass % or more, more preferably 11 mass % or more, and further preferably 16 mass % or more; and preferably 77 mass % or less, more preferably 75 mass % or less and further preferably 73 mass % or less.
<24>
The dispersant composition for a hydraulic composition described in any one of the above <1> to <23>, wherein the dispersant composition for a hydraulic composition contains water and the components (A) and (B) are contained in the composition in total in an amount of preferably 10 mass % or more, and more preferably 30 mass % or more; and preferably 90 mass % or less, more preferably 70 mass % or less, and further preferably 50 mass % or less.
<25>
The dispersant composition for a hydraulic composition described in any one of the above <1> to <24>, wherein the dispersant composition excludes a composition for a hydraulic composition for centrifugal molding and a composition for a hydraulic composition for steam curing.
<26>
A hydraulic composition, containing a hydraulic powder, water, (A) a polymer compound having a naphthalene ring-containing monomer unit, and (B) one or more compounds represented by the general formula (B1),
wherein a molar ratio of a total amount of (B) to the naphthalene ring-containing monomer unit in (A) is 3% or more and 16% or less,

 (B1)

wherein:
R is an alkyl group having a carbon number of 10 or more and 22 or less, an alkenyl group having a carbon number of 10 or more and 22 or less, a benzyl phenyl group having a carbon number of 13 or more and 27 or less, or a styrenated phenyl group having a carbon number of 14 or more and 30 or less;
X is O or COO;
AO is an alkyleneoxy group having a carbon number of 2 or more and 4 or less;
n represents an average number of AO moles added and is 1 or more and 200 or less; and
Y is a hydrogen atom or an alkyl group having a carbon number of 1 or more and 4 or less.
<27>
The hydraulic composition described in the above <26>, wherein the component (A) is a formaldehyde naphthalenesulfonate condensate or a salt thereof.

<28>

The hydraulic composition described in the above <27>, wherein the component (A) has a weight average molecular weight of preferably 200,000 or less, more preferably 100,000 or less, further preferably 80,000 or less, further more preferably 50,000 or less, and further more preferably 20,000 or less.

<29>

The hydraulic composition described in the above <27> or <28>, wherein the component (A) has a weight average molecular weight of preferably 1,000 or more, more preferably 3,000 or more, further preferably 4,000 or more, and further more preferably 5,000 or more.

<30>

The hydraulic composition described in any one of the above <26> to <29>, wherein R in the general formula (B1) of the component (B) is: an alkyl group having a carbon number of 10 or more, and preferably 12 or more, and 22 or less, preferably 20 or less, and more preferably 18 or less; an alkenyl group having a carbon number of 10 or more, and preferably 12 or more, and 22 or less, preferably 20 or less, and more preferably 18 or less; a benzyl phenyl group having a carbon number of 13 or more, preferably 15 or more, and more preferably 19 or more, and 27 or less; or a styrenated phenyl group having a carbon number of 14 or more, preferably 16 or more, more preferably 20 or more, and 30 or less, preferably 28 or less, and more preferably 26 or less.

<31>

The hydraulic composition described in any one of the above <26> to <30>, wherein R in the general formula (B1) of the component (B) is an alkyl group or an alkenyl group, preferably an aliphatic alkyl group or an aliphatic alkenyl group, more preferably a linear aliphatic alkyl group or a linear aliphatic alkenyl group, and further preferably a linear primary aliphatic alkyl group or a linear primary aliphatic alkenyl group.

<32>

The hydraulic composition described in any one of the above <26> to <30>, wherein R in the general formula (B1) of the component (B) is a benzyl phenyl group or a styrenated phenyl group, preferably a group selected from a monostyrenated phenyl group, a distyrenated phenyl group, a tristyrenated phenyl group, a monobenzyl phenyl group, a dibenzyl phenyl group, and a tribenzyl phenyl group, more preferably a group selected from a distyrenated phenyl group and a tribenzyl phenyl group, and further preferably a group selected from a distyrenated phenyl group and a tribenzyl phenyl group.

<33>

The hydraulic composition described in any one of the above <26> to <30>, wherein R in the general formula (B1) of the component (B) is: a group selected from a decyl group, a lauryl group, a myristyl group, a palmityl group, a stearyl group, a behenyl group, an isostearyl group, an oleyl group, a monostyrenated phenyl group, a distyrenated phenyl group, a tristyrenated phenyl group, a monobenzyl phenyl group, a dibenzyl phenyl group, and a tribenzyl phenyl group; preferably a group selected from a lauryl group, a myristyl group, a palmityl group, a stearyl group, a behenyl group, an isostearyl group, an oleyl group, a distyrenated phenyl group, and a tribenzyl phenyl group; and more preferably a group selected from a lauryl group, a myristyl group, a palmityl group, a stearyl group, an oleyl group, a distyrenated phenyl group, and a tribenzyl phenyl group.

<34>

The hydraulic composition described in any one of the above <26> to <33>, wherein the component (B) is a compound, wherein X in the general formula (B1) is O.

<35>

The hydraulic composition described in any one of the above <26> to <34>, wherein the component (B) is a compound wherein AO in the general formula (B1) is an alkyleneoxy group having 2 or 3 carbon atoms, or a compound wherein AO in the general formula (B1) includes an alkyleneoxy group having 2 carbon atoms.

<36>

The hydraulic composition described in any one of the above <26> to <35>, wherein the component (B) is a compound wherein n in the general formula (B1) is 1 or more, preferably 9 or more, more preferably 10 or more, further preferably 20 or more, further more preferably 30 or more, further more preferably 40 or more, and further more preferably 50 or more; and 200 or less, preferably 150 or less, and more preferably 100 or less.

<37>

The hydraulic composition described in any one of the above <26> to <36>, wherein the component (B) is a compound wherein Y in the general formula (B1) is a hydrogen atom.

<38>

The hydraulic composition described in any one of the above <26> to <37>, wherein a mass ratio between the components (A) and (B), (A)/(B), is preferably 0.8 or more, more preferably 0.9 or more, and further preferably 1.0 or more; and preferably 20 or less, more preferably 15 or less, and further preferably 10 or less.

<39>

The hydraulic composition described in any one of the above <26> to <38>, wherein a mass ratio between the components (A) and (B), (A)/(B), is preferably 0.5 or more, more preferably 0.7 or more, and further preferably 9.0 or more; and preferably 15 or less, more preferably 8.0 or less, further preferably 6.0 or less, further more preferably 4.0 or less, and further more preferably 2.0 or less.

<40>

The hydraulic composition described in any one of the above <26> to <39>, wherein a molar ratio of the total amount of the component (B) to the naphthalene ring-containing monomer unit in the component (A) is 3% or more, preferably 4% or more, more preferably 5% or more, and further preferably 6% or more; and 16% or less, preferably less than 16%, more preferably 15% or less, further preferably 14% or less, and further more preferably 13% or less, and further more preferably 11% or less.

<41>

The hydraulic composition described in any one of the above <26> to <40>, wherein the hydraulic powder is cement or gypsum.

<42>

The hydraulic composition described in any one of the above <26> to <41>, wherein a ratio of the water to the hydraulic power is preferably 15 mass % or more, and more preferably 20 mass % or more; and preferably 50 mass % or less, and more preferably 45 mass % or less.

<43>

The hydraulic composition described in any one of the above <26> to <42>, wherein the component (A) is contained in an amount of preferably 0.01 parts by mass or more, more preferably 0.05 parts by mass or more, further preferably 0.1 parts by mass or more, further more preferably 0.15 parts by mass or more, and further more preferably 0.22 parts by mass or more; and preferably 2 parts by mass or less, more preferably 1.5 parts by mass or less, further preferably 1.0 part by mass or less, further more preferably 0.50 parts by mass or less, further more preferably 0.40 parts by mass, and further more preferably 0.30 parts by mass, relative to 100 parts by mass of the hydraulic powder.
<44>
The hydraulic composition described in anyone of the above <26> to <43>, wherein the component (B) is contained in an amount of preferably 0.001 parts by mass or more, more preferably 0.005 parts by mass or more, further preferably 0.01 parts by mass or more, further more preferably 0.04 parts by mass or more, further more preferably 0.10 parts by mass or more, and further more preferably 0.20 parts by mass or more; and preferably 2.0 parts by mass or less, more preferably 1.5 parts by mass or less, further preferably 1.0 part by mass or less, further more preferably 0.40 parts by mass or less, further more preferably 0.35 parts by mass or less, and further more preferably 0.28 parts by mass or less, relative to 100 parts by mass of the hydraulic powder.
<45>
The hydraulic composition described in any one of the above <26> to <44>, wherein the components (A) and (B) are contained in total in an amount of preferably 0.01 parts by mass or more, more preferably 0.05 parts by mass or more, further preferably 0.1 parts by mass or more, and further more preferably 0.2 parts by mass or more; and preferably 4 parts by mass or less, more preferably 3.0 parts by mass or less, further preferably 2.0 parts by mass or less, and further more preferably 0.9 parts by mass or less, relative to 100 parts by mass of the hydraulic powder.
<46>
The hydraulic composition described in any one of the above <26> to <45>, further containing (C) an antifoaming agent, preferably a fatty acid ester-based antifoaming agent.
<47>
The hydraulic composition described in the above <46>, wherein the component (C) is contained in an amount of preferably 0.00005 parts by mass or more, more preferably 0.00025 parts by mass or more, and further preferably 0.0005 parts by mass or more; and preferably 0.1 parts by mass or less, more preferably 0.075 parts by mass or less, and further preferably 0.05 parts by mass or less, relative to 100 parts by mass of the hydraulic powder.
<48>
The hydraulic composition described in the above <46> or <47>, wherein a mass ratio between the components (B) and (C), (C)/(B), is preferably 0.000001 or more, more preferably 0.00005 or more, and further preferably 0.0001 or more; and preferably 0.5 or less, more preferably 0.1 or less, and further preferably 0.05 or less.
<49>
The hydraulic composition described in anyone of the above <26> to <48>, wherein the hydraulic composition excludes a composition for centrifugal molding and a composition for steam curing.
<50>
A method for manufacturing a dispersant composition for a hydraulic composition, the dispersant composition containing (A) a polymer compound having a naphthalene ring-containing monomer unit; and (B) one or more compounds represented by the following general formula (B1),
the method including mixing (A) and (B) so that a molar ratio of a total amount of (B) to the naphthalene ring-containing monomer unit in (A) is 3% or more and 16% or less, R—X-(AO)$_n$—Y (B1)

wherein:
R is an alkyl group having a carbon number of 10 or more and 22 or less, an alkenyl group having a carbon number of 10 or more and 22 or less, a benzyl phenyl group having a carbon number of 13 or more and 27 or less, or a styrenated phenyl group having a carbon number of 14 or more and 30 or less;
X is O or COO;
AO is an alkyleneoxy group having a carbon number of 2 or more and 4 or less;
n represents an average number of AO moles added and is 1 or more and 200 or less; and
Y is a hydrogen atom or an alkyl group having a carbon number of 1 or more and 4 or less.
<51>
The method for manufacturing a dispersant composition for a hydraulic composition described in the above <50>, wherein the method excludes a method for manufacturing a dispersant composition for a hydraulic composition for centrifugal molding and a dispersant composition for a hydraulic composition for steam curing.
<52>
A method for manufacturing a hydraulic composition, the method including mixing a hydraulic powder, water, (A) a polymer compound having a naphthalene ring-containing monomer unit, and (B) one or more compounds represented by the following general formula (B1),
wherein (B) is mixed so that a molar ratio of a total amount of (B) to the naphthalene ring-containing monomer unit in (A) is 3% or more and 16% or less, R—X-(AO)$_n$—Y (B1)

wherein:
R is an alkyl group having a carbon number of 10 or more and 22 or less, an alkenyl group having a carbon number of 10 or more and 22 or less, a benzyl phenyl group having a carbon number of 13 or more and 27 or less, or a styrenated phenyl group having a carbon number of 14 or more and 30 or less;
X is O or COO;
AO is an alkyleneoxy group having a carbon number of 2 or more and 4 or less;
n represents an average number of AO moles added and is 1 or more and 200 or less; and
Y is a hydrogen atom or an alkyl group having a carbon number of 1 or more and 4 or less.
<53>
The method for manufacturing a hydraulic composition described in the above <52>, wherein the method excludes a method for manufacturing a hydraulic composition for centrifugal molding and a hydraulic composition for steam curing.
<54>
In preparing a hydraulic composition by mixing a hydraulic powder, water, and (A) a polymer compound having a naphthalene ring-containing monomer unit,
a method for improving dispersing performance of (A) for the hydraulic powder, the method including adding (B) one or more compounds represented by the following general formula (B1) so that a molar ratio of a total amount of the component (B) to the naphthalene ring-containing monomer unit in the component (A) is 3% or more and 16% or less, R—X-(AO)$_n$—Y (B1)

wherein:

R is an alkyl group having a carbon number of 10 or more and 22 or less, an alkenyl group having a carbon number of 10 or more and 22 or less, a benzyl phenyl group having a carbon number of 13 or more and 27 or less, or a styrenated phenyl group having a carbon number of 14 or more and 30 or less;

X is O or COO;

AO is an alkyleneoxy group having a carbon number of 2 or more and 4 or less;

n represents an average number of AO moles added and is 1 or more and 200 or less; and Y is a hydrogen atom or an alkyl group having a carbon number of 1 or more and 4 or less.

<55>

The method for improving dispersing performance described in the above <54>, wherein the hydraulic composition excludes a hydraulic composition for centrifugal molding and a hydraulic composition for steam curing.

<56>

Use of the dispersant composition for a hydraulic composition described in any one of the above <1> o <25> as a dispersant for a hydraulic composition containing a hydraulic powder and water.

<57>

Use described in the above <56>, excluding use as a dispersant for a hydraulic composition for centrifugal molding and a dispersant for a hydraulic composition for steam curing.

<58>

A dispersant composition for an inorganic powder containing (A) a polymer compound having a naphthalene ring-containing monomer unit and (B) one or more compounds represented by the following general formula (B1), wherein a molar ratio of a total amount of (B) to the naphthalene ring-containing monomer unit in (A) is 3% or more and 16% or less,

R—X-(AO)$_n$—Y      (B1)

wherein:

R is an alkyl group having a carbon number of 10 or more and 22 or less, an alkenyl group having a carbon number of 10 or more and 22 or less, a benzyl phenyl group having a carbon number of 13 or more and 27 or less, or a styrenated phenyl group having a carbon number of 14 or more and 30 or less;

X is O or COO;

AO is an alkyleneoxy group having a carbon number of 2 or more and 4 or less;

n represents an average number of AO moles added and is 1 or more and 200 or less; and Y is a hydrogen atom or an alkyl group having a carbon number of 1 or more and 4 or less.

<59>

The dispersant composition for an inorganic powder described in the above <58>, further containing (C) an antifoaming agent.

<60>

The dispersant composition for an inorganic powder described in the above <59>, wherein the antifoaming agent (C) is a fatty acid ester-based antifoaming agent.

<61>

The dispersant composition for an inorganic powder described in any one of the above <58> to <60>, wherein (A) is a formaldehyde naphthalenesulfonate condensate or a salt thereof.

EXAMPLES

Example 1 and Comparative Example 1

(1) Preparation of Mortar

Into a mortar mixer (universal mixing stirrer, model: 5DM-03-γ manufactured by Dalton Corporation), a cement (C) and a fine aggregate (S) were fed and dry-mixed for 10 seconds at a low speed rotation (63 rpm) of the mortar mixer, and then mixing water (W) containing component (A), component (B) and an antifoaming agent was added. Then, the mixture was subjected to main kneading for 120 seconds at a low speed rotation (63 rpm) of the mortar mixer, so that a mortar was prepared.

Blending conditions for the mortar: 400 g of cement, 700 g of fine aggregate, and water/cement ratio (W/C)=45 mass %

The following components were used.

Water (W): water from public water supply system (water temperature: 22° C.)

Cement (C): ordinary portland cement (mixture of two types: Taiheiyo Cement Corporation/Sumitomo Osaka Cement Co., Ltd=1/1, mass ratio), density: 3.16 g/cm$^3$ Fine aggregate (S): pit sand from Joyo area, density: 2.55 g/cm$^3$ Component (A): sodium salt of a formaldehyde naphthalenesulfonate condensate, weight average molecular weight: 15000 (described as Dispersant A in Table 1)

Component (B): as shown in the Tables, numerals in parentheses of compounds in the tables represent an average number of ethylene oxide moles added, and they indicate n in the general formula (B1). Note that in the Tables, compounds not corresponding to the component (B) are indicated in the columns for component (B) for convenience's sake.

The molecular weight of component (B) was calculated by software called ChemBioDraw (manufactured by PerkinElmer) based on the molecular formula of the compound (the same was applied to the following Examples and Comparative Examples).

Antifoaming agent: Foamlex 797 (fatty acid ester-based) manufactured by Nicca Chemical Co., Ltd., was added in an amount of 0.05 g for the above blending of mortar.

(2) Evaluation of Fluidity

In accordance with the test method of JIS R5201, the flow of the prepared mortar was measured. It should be noted that no operation for falling motion was conducted. Results are shown in Table 1.

TABLE 1

| | | Component (A) | | Component (B) | | | | Total | | |
|---|---|---|---|---|---|---|---|---|---|---|
| | | | | | | | | W/C = 45 mass % | | |
| | | Type | Added amount *1 (part by mass) | Type | Molecular weight | Carbon No. of R *2 | Added amount *1 (part by mass) | added amount *3 (part by mass) | Molar ratio *4 (%) | Mortar flow (mm) |
| Examples | 1-1 | Dispersant A | 0.335 | Polyoxyethylene (10) decyl ether | 599 | 10 | 0.065 | 0.400 | 7.8 | 197 |
| | 1-2 | | 0.354 | Polyoxyethylene (9) lauryl ether | 583 | 12 | 0.046 | 0.400 | 5.4 | 191 |
| | 1-3 | | 0.300 | Polyoxyethylene (23) lauryl ether | 1199 | 12 | 0.100 | 0.400 | 6.7 | 209 |
| | 1-4 | | 0.238 | Polyoxyethylene (47) lauryl ether | 2257 | 12 | 0.162 | 0.400 | 7.3 | 253 |
| | 1-5 | | 0.326 | Polyoxyethylene (9.6) oleyl ether | 691 | 18 | 0.074 | 0.400 | 8.0 | 191 |
| | 1-6 | | 0.263 | Polyoxyethylene (30) oleyl ether | 1590 | 18 | 0.137 | 0.400 | 7.9 | 214 |
| | 1-7 | | 0.205 | Polyoxyethylene (60) oleyl ether | 2911 | 18 | 0.195 | 0.400 | 7.9 | 305 |
| | 1-8 | | 0.263 | Polyoxyethylene (30) stearyl ether | 1592 | 18 | 0.137 | 0.400 | 7.9 | 212 |
| | 1-9 | | 0.276 | Polyoxyethylene (25) isostearyl ether | 1372 | 18 | 0.124 | 0.400 | 7.9 | 198 |
| | 1-10 | | 0.263 | Polyoxyethylene (30) monostearate | 1606 | 18 | 0.137 | 0.400 | 7.9 | 201 |
| | 1-11 | | 0.281 | Mixture (molar ratio = 1:1) of polyoxyethylene (23) lauryl ether and polyoxyethylene (30) oleyl ether | 1199, 1590 | 12, 18 | 0.119 | 0.400 | 7.3 | 213 |
| | 1-12 | | 0.336 | Polyoxyethylene (7) oleyl ether | 577 | 18 | 0.064 | 0.400 | 8.0 | 167 |
| | 1-13 | | 0.356 | Polyoxyethylene (5) decyl ether | 379 | 10 | 0.044 | 0.400 | 7.9 | 188 |
| | 1-14 | | 0.378 | Polyoxyethylene (4) lauryl ether | 363 | 12 | 0.022 | 0.400 | 3.9 | 166 |
| | 1-15 | | 0.302 | Polyoxyethylene (14) tribenzylated phenyl ether | 981 | 27 | 0.100 | 0.402 | 8.2 | 201 |
| Comparative Examples | 1-1 | Dispersant A | 0.40 | — | — | — | — | 0.40 | — | 180 |
| | 1-2 | — | — | Polyoxyethylene (60) oleyl ether | 2911 | 18 | 0.40 | 0.40 | — | 108 |
| | 1-3 | Dispersant A | 0.33 | Polyoxyethylene (11) 2-ethylhexyl ether | 615 | 8 | 0.07 | 0.40 | 7.9 | 186 |
| | 1-4 | | 0.27 | Polyoxyethylene (30) 2-ethylhexyl ether | 1452 | 8 | 0.13 | 0.40 | 7.9 | 157 |

*1 Added amount: added amount (part by mass) of component (A) or (B) relative to 100 parts by mass of cement
*2 Carbon number of R: carbon number of a group corresponding to R in the general formula (B1)
*3 Total added amount: total added amount (part by mass) of components (A) and (B) relative to 100 parts by mass of cement
*4 Molar ratio: ratio (%) of component (B) to a naphthalene ring-containing monomer unit in component (A)

It was found that, among Examples using components (A) and (B), some of them exhibited higher mortar flow values than Comparative Example 1-1 using only component (A) and Comparative Example 1-2 using only component (B) even when these components were added in the same amounts. Further, it was found that Comparative Examples 1-3 and 1-4 using a compound wherein a group corresponding to R of component (B) has 8 carbon atoms exhibited poor mortar flows compared to Examples 1-1 and 1-2 having a value of n close thereto or Example 1-6 having the same value of n.

Example 2 and Comparative Example 2

Mortars were prepared in the same manner as in Example 1 and the fluidity was evaluated. However, the water/cement ratio (W/C) for the mortar blending conditions was 35 mass % by changing the amount of water, and the total added amount of components (A) and (B) was 0.500 parts by mass, relative to 100 parts by mass of cement. Results are shown in Table 2.

TABLE 2

| | | | Component (A) | | Component (B) | | | Total | | |
|---|---|---|---|---|---|---|---|---|---|---|
| | | | | | | W/C = 35 mass % | | | | |
| | | Type | Added amount *1 (part by mass) | Type | Molecular weight | Carbon No. of R *2 | Added amount *1 (part by mass) | added amount *3 (part by mass) | Molar ratio *4 (%) | Mortar flow (mm) |
| Examples | 2-1 | Dispersant A | 0.368 | Polyoxyethylene (60) oleyl ether | 2911 | 18 | 0.132 | 0.50 | 3.0 | 130 |
| | 2-2 | | 0.256 | Polyoxyethylene (60) oleyl ether | 2911 | 18 | 0.244 | 0.50 | 7.9 | 230 |
| | 2-3 | | 0.172 | Polyoxyethylene (60) oleyl ether | 2911 | 18 | 0.328 | 0.50 | 15.9 | 133 |
| | 2-4 | | 0.271 | Polyoxyethylene (47) lauryl ether | 2257 | 12 | 0.229 | 0.50 | 9.1 | 150 |
| | 2-5 | | 0.212 | Polyoxyethylene (47) lauryl ether | 2257 | 12 | 0.288 | 0.50 | 14.6 | 117 |
| Comparative Examples | 2-1 | Dispersant A | 0.500 | — | — | — | — | 0.50 | — | 115 |
| | 2-2 | | 0.447 | Polyoxyethylene (60) oleyl ether | 2911 | 18 | 0.053 | 0.50 | 1.0 | 110 |
| | 2-3 | | 0.148 | Polyoxyethylene (60) oleyl ether | 2911 | 18 | 0.352 | 0.50 | 19.8 | 106 |
| | 2-4 | | 0.461 | Polyoxyethylene (47) lauryl ether | 2257 | 12 | 0.039 | 0.50 | 0.9 | 109 |
| | 2-5 | | 0.198 | Polyoxyethylene (47) lauryl ether | 2257 | 12 | 0.302 | 0.50 | 16.4 | 108 |

*1 Added amount: added amount (part by mass) of component (A) or (B) relative to 100 parts by mass of cement
*2 Carbon number of R: carbon number of a group corresponding to R in the general formula (B1)
*3 Total added amount: total added amount (part by mass) of components (A) and (B) relative to 100 parts by mass of cement
*4 Molar ratio: ratio (%) of component (B) to a naphthalene ring-containing monomer unit in component (A)

A comparison between Examples 2-1 to 2-3 and Comparative Examples 2-2 and 2-3 was made when the same compounds were used for components (A) and (B) and the total added amount of them was constant. It was found that higher mortar flow values were observed when the molar ratios between components (A) and (B) were in the range of 3% to 16%. Likewise, in a comparison between Examples 2-4 to 2-5 and Comparative Examples 2-4 to 2-5, it was found that higher mortar flow values were observed when the molar ratios between components (A) and (B) were in the range of 3% to 16%.

Example 3 and Comparative Example 3

Dispersant compositions for a hydraulic composition shown in Table 3 were prepared. Those obtained by mixing the dispersant compositions for a hydraulic composition with water for mortar preparation in advance were used as mixing water (W), mortars were prepared in the same manner as in Example 1, and their fluidity was evaluated. The added amounts of components (A) and (B) relative to 100 parts by mass of cement were as shown in Table 3. Results are shown in Table 3.

TABLE 3

| | | | Component (A) | | Component (B) | | | | | Added amount *3 (part by mass) |
|---|---|---|---|---|---|---|---|---|---|---|
| | | | | | | W/C = 45 mass % | | | | |
| | | | | | | Dispersant composition for hydraulic composition | | | | |
| | | Type | Added amount *1 (mass %) | Type | Molecular weight | Carbon No. of R *2 | Content *1 (mass %) | Water Content *1 (mass %) | | |
| Examples | 3-1 | Dispersant A | 33.5 | Polyoxyethylene (10) decyl ether | 599 | 10 | 6.5 | 60.0 | | 1.00 |
| | 3-2 | | 35.4 | Polyoxyethylene (9) lauryl ether | 583 | 12 | 4.6 | 60.0 | | 1.00 |
| | 3-3 | | 30.0 | Polyoxyethylene (23) lauryl ether | 1199 | 12 | 10.0 | 60.0 | | 1.00 |
| | 3-4 | | 23.8 | Polyoxyethylene (47) lauryl ether | 2257 | 12 | 16.2 | 60.0 | | 1.00 |
| | 3-5 | | 32.6 | Polyoxyethylene (9.6) oleyl ether | 691 | 18 | 7.4 | 60.0 | | 1.00 |
| | 3-6 | | 26.3 | Polyoxyethylene (30) oleyl ether | 1590 | 18 | 13.7 | 60.0 | | 1.00 |
| | 3-7 | | 20.5 | Polyoxyethylene (60) oleyl ether | 2911 | 18 | 19.5 | 60.0 | | 1.00 |
| | 3-8 | | 26.3 | Polyoxyethylene (30) stearyl ether | 1592 | 18 | 13.7 | 60.0 | | 1.00 |

TABLE 3-continued

| | | | W/C = 45 mass % | | | | | |
|---|---|---|---|---|---|---|---|---|
| | 3-9 | | 27.6 | Polyoxyethylene (25) isostearyl ether | 1372 | 18 | 12.4 | 60.0 | 1.00 |
| | 3-10 | | 26.3 | Polyoxyethylene (30) monostearate | 1606 | 18 | 13.7 | 60.0 | 1.00 |
| | 3-11 | | 33.6 | Polyoxyethylene (7) oleyl ether | 577 | 18 | 6.4 | 60.0 | 1.00 |
| | 3-12 | | 35.6 | Polyoxyethylene (5) decyl ether | 379 | 10 | 4.4 | 60.0 | 1.00 |
| | 3-13 | | 37.8 | Polyoxyethylene (4) lauryl ether | 363 | 12 | 2.2 | 60.0 | 1.00 |
| | 3-14 | | 30.0 | Polyoxyethylene (14) tribenzylated phenyl ether | 981 | 27 | 10.0 | 60.0 | 1.00 |
| Comparative Examples | 3-1 | Dispersant A | 40.0 | — | — | — | — | — | 1.00 |
| | 3-2 | — | — | Polyoxyethylene (60) oleyl ether | 2911 | 18 | 40.0 | 60.0 | 1.00 |
| | 3-3 | Dispersant A | 33.3 | Polyoxyethylene (11) 2-ethylhexyl ether | 615 | 8 | 6.7 | 60.0 | 1.00 |
| | 3-4 | | 27.1 | Polyoxyethylene (30) 2-ethylhexyl ether | 1452 | 8 | 12.9 | 60.0 | 1.00 |

| | | Added amount of (A) *3 (part by mass) | Added amount of (B) *3 (part by mass) | Total added amount *4 (part by mass) | Molar ratio *5 (%) | Mortar flow (mm) |
|---|---|---|---|---|---|---|
| Examples | 3-1 | 0.335 | 0.065 | 0.400 | 7.8 | 195 |
| | 3-2 | 0.354 | 0.046 | 0.400 | 5.4 | 190 |
| | 3-3 | 0.300 | 0.100 | 0.400 | 6.7 | 209 |
| | 3-4 | 0.238 | 0.162 | 0.400 | 7.3 | 256 |
| | 3-5 | 0.326 | 0.074 | 0.400 | 8.0 | 191 |
| | 3-6 | 0.263 | 0.137 | 0.400 | 7.9 | 220 |
| | 3-7 | 0.205 | 0.195 | 0.400 | 7.9 | 300 |
| | 3-8 | 0.263 | 0.137 | 0.400 | 7.9 | 220 |
| | 3-9 | 0.276 | 0.124 | 0.400 | 7.9 | 198 |
| | 3-10 | 0.263 | 0.137 | 0.400 | 7.9 | 201 |
| | 3-11 | 0.336 | 0.064 | 0.400 | 8.0 | 168 |
| | 3-12 | 0.356 | 0.044 | 0.400 | 7.9 | 185 |
| | 3-13 | 0.378 | 0.022 | 0.400 | 3.9 | 168 |
| | 3-14 | 0.300 | 0.100 | 0.400 | 8.2 | 202 |
| Comparative Examples | 3-1 | 0.400 | — | 0.400 | — | 180 |
| | 3-2 | — | 0.400 | 0.400 | — | 102 |
| | 3-3 | 0.333 | 0.067 | 0.400 | 7.9 | 185 |
| | 3-4 | 0.271 | 0.129 | 0.400 | 7.9 | 155 |

*1 Content: content in a dispersant composition for a hydraulic composition (mass %)
*2 Carbon number of R: carbon number of a group corresponding to R in the general formula (B1)
*3 Added amount: added amount (part by mass) of a dispersant composition for a hydraulic composition, or component (A) or (B) relative to 100 parts by mass of cement
*4 Total added amount: total added amount (part by mass) of components (A) and (B) relative to 100 parts by mass of cement
*5 Molar ratio: ratio (%) of component (B) to a naphthalene ring-containing monomer unit in component (A)

A dispersant composition for a hydraulic composition was prepared by mixing components (A) and (B) with water, and was added in the same amount to hydraulic compositions. It was found that, when the added amount was the same, Examples 3-1 to 3-10 using components (A) and (B) exhibited higher mortar flow values compared to Comparative Example 3-1 using only component (A) and Comparative Example 3-2 using only component (B). Further, Comparative Examples 3-3 and 3-4 using a compound wherein a group corresponding to R in component (B) has 8 carbon atoms exhibited poor mortar flows than Examples 3-1 to 3-10.

Example 4 and Comparative Example 4

Mortars were prepared in the same manner as in Example 2 and the fluidity was evaluated. However, added amounts of the components (A) and (B) relative to 100 parts by mass of cement were as indicated in Table 4. Results are shown in Table 4.

TABLE 4

W/C = 35 mass %

| | | Component (A) | | Component (B) | | | | Total | | |
|---|---|---|---|---|---|---|---|---|---|---|
| | | Type | Added amount *1 (part by mass) | Type | Molecular weight | Carbon No. of R *2 | Added amount *1 (part by mass) | added amount *3 (part by mass) | Molar ratio *4 (%) | Mortar flow (mm) |
| Examples | 4-1 | Dispersant A | 0.50 | Polyoxyethylene (60) oleyl ether | 2911 | 18 | 0.18 | 0.68 | 3.0 | 161 |
| | 4-2 | Dispersant A | 0.50 | Polyoxyethylene (60) oleyl ether | 2911 | 18 | 0.48 | 0.98 | 8.0 | 295 |
| | 4-3 | Dispersant A | 0.50 | Polyoxyethylene (60) oleyl ether | 2911 | 18 | 0.95 | 1.45 | 15.8 | 261 |
| | 4-4 | Dispersant A | 0.50 | Polyoxyethylene (47) lauryl ether | 2257 | 12 | 0.17 | 0.67 | 3.6 | 127 |
| | 4-5 | Dispersant A | 0.50 | Polyoxyethylene (47) lauryl ether | 2257 | 12 | 0.46 | 0.96 | 9.9 | 285 |
| | 4-6 | Dispersant A | 0.50 | Polyoxyethylene (47) lauryl ether | 2257 | 12 | 0.73 | 1.23 | 15.7 | 201 |
| Comparative Examples | 4-1 | Dispersant A | 0.50 | — | — | — | — | 0.50 | — | 115 |
| | 4-2 | Dispersant A | 0.50 | Polyoxyethylene (60) oleyl ether | 2911 | 18 | 0.06 | 0.56 | 1.0 | 112 |
| | 4-3 | Dispersant A | 0.50 | Polyoxyethylene (60) oleyl ether | 2911 | 18 | 1.67 | 2.17 | 27.8 | 100 |
| | 4-4 | Dispersant A | 0.50 | Polyoxyethylene (47) lauryl ether | 2257 | 12 | 0.06 | 0.56 | 1.3 | 110 |
| | 4-5 | Dispersant A | 0.50 | Polyoxyethylene (47) lauryl ether | 2257 | 12 | 1.62 | 2.12 | 34.8 | 100 |
| | 4-6 | — | — | Polyoxyethylene (60) oleyl ether | 2911 | 18 | 0.50 | 0.50 | — | 100 |
| | 4-7 | — | — | Polyoxyethylene (60) oleyl ether | 2911 | 18 | 1.00 | 1.00 | — | 100 |
| | 4-8 | — | — | Polyoxyethylene (47) lauryl ether | 2257 | 12 | 0.50 | 0.50 | — | 100 |
| | 4-9 | — | — | Polyoxyethylene (47) lauryl ether | 2257 | 12 | 1.00 | 1.00 | — | 100 |

*1 Added amount: added amount (part by mass) of component (A) or (B) relative to 100 parts by mass of cement
*2 Carbon number of R: carbon number of a group corresponding to R in the general formula (B1)
*3 Total added amount: total added amount (part by mass) of components (A) and (B) relative to 100 parts by mass of cement
*4 Molar ratio: ratio (%) of component (B) to a naphthalene ring-containing monomer unit in component (A)

A comparison between Examples 4-1 to 4-3 and Comparative Examples 4-2 to 4-3 was made when the same compounds were used for components (A) and (B) and the added amount of component (A) was constant. It was found that higher mortar flow values were observed when the molar ratios between components (A) and (B) were in the range of 3 to 16. Likewise, in a comparison between Examples 4-4 to 4-6 and Comparative Examples 4-4 to 4-5, it was found that higher mortar flow values were observed when the molar ratios between components (A) and (B) were in the range of 3% to 16%.

Example 5 and Comparative Example 5

Mortars were prepared in the same manner as in Example 1, and the fluidity was evaluated when plural components (B) were mixed. However, the water/cement ratio (W/C) for the mortar blending conditions was 37.5 mass % by changing the amount of water, and the total added amount of components (A) and (B) was 0.450 parts by mass, relative to 100 parts by mass of cement. Results are shown in Table 5.

TABLE 5

W/C = 35 mass %

| | | Component (A) | | Component (B) (B-1) | | | | |
|---|---|---|---|---|---|---|---|---|
| | | Type | Added amount *1 (mass %) | Type | Molecular weight | Carbon No. of R *2 | Added amount *1 (mass %) | Molar ratio *3 (%) |
| Examples | 5-1 | Dispersant A | 0.259 | Polyoxyethylene (47) lauryl ether | 2257 | 12 | 0.19 | 8.0 |
| | 5-2 | Dispersant A | 0.258 | Polyoxyethylene (47) lauryl ether | 2257 | 12 | 0.14 | 6.0 |
| | 5-3 | Dispersant A | 0.257 | Polyoxyethylene (47) lauryl ether | 2257 | 12 | 0.10 | 4.0 |
| | 5-4 | Dispersant A | 0.256 | Polyoxyethylene (47) lauryl ether | 2257 | 12 | 0.05 | 2.0 |

TABLE 5-continued

W/C = 35 mass %

|  |  | Component (A) | | Component (B) (B-1) | | | | |
|---|---|---|---|---|---|---|---|---|
|  |  | Type | Added amount *1 (mass %) | Type | Molecular weight | Carbon No. of R *2 | Added amount *1 (mass %) | Molar ratio *3 (%) |
|  | 5-5 | Dispersant A | 0.255 | Polyoxyethylene (47) lauryl ether | 2257 | 12 | 0.00 | 0.0 |
|  | 5-6 | Dispersant A | 0.353 | Polyoxyethylene (13) stearyl ether | 843 | 18 | 0.10 | 8.0 |
|  | 5-7 | Dispersant A | 0.322 | Polyoxyethylene (13) stearyl ether | 843 | 18 | 0.07 | 6.0 |
|  | 5-8 | Dispersant A | 0.296 | Polyoxyethylene (13) stearyl ether | 843 | 18 | 0.04 | 4.0 |
|  | 5-9 | Dispersant A | 0.274 | Polyoxyethylene (13) stearyl ether | 843 | 18 | 0.02 | 2.0 |
|  | 5-10 | Dispersant A | 0.255 | Polyoxyethylene (13) stearyl ether | 843 | 18 | 0.00 | 0.0 |
| Comparative Examples | 5-11 | Dispersant A | 0.250 | — | — | — | — | — |
|  | 5-12 | Dispersant A | 0.450 | — | — | — | — | — |

|  |  | Component (B) (B-2) | | | | | Total added amount *4 (part by mass) | Mortar flow (mm) |
|---|---|---|---|---|---|---|---|---|
|  |  | Type | Molecular weight | Carbon No. of R *2 | Added amount *1 (mass %) | Molar ratio *3 (%) |  |  |
| Examples | 5-1 | Polyoxyethylene (47) stearyl ether | 2341 | 18 | 0.00 | 0.0 | 0.450 | 136 |
|  | 5-2 | Polyoxyethylene (47) stearyl ether | 2341 | 18 | 0.05 | 2.0 | 0.450 | 187 |
|  | 5-3 | Polyoxyethylene (47) stearyl ether | 2341 | 18 | 0.10 | 4.0 | 0.450 | 218 |
|  | 5-4 | Polyoxyethylene (47) stearyl ether | 2341 | 18 | 0.15 | 6.0 | 0.450 | 233 |
|  | 5-5 | Polyoxyethylene (47) stearyl ether | 2341 | 18 | 0.20 | 8.0 | 0.450 | 274 |
|  | 5-6 | Polyoxyethylene (47) stearyl ether | 2341 | 18 | 0.00 | 0.0 | 0.450 | 118 |
|  | 5-7 | Polyoxyethylene (47) stearyl ether | 2341 | 18 | 0.06 | 2.0 | 0.450 | 153 |
|  | 5-8 | Polyoxyethylene (47) stearyl ether | 2341 | 18 | 0.11 | 4.0 | 0.450 | 190 |
|  | 5-9 | Polyoxyethylene (47) stearyl ether | 2341 | 18 | 0.16 | 6.0 | 0.450 | 274 |
|  | 5-10 | Polyoxyethylene (47) stearyl ether | 2341 | 18 | 0.20 | 8.0 | 0.450 | 274 |
| Comparative Examples | 5-11 | — | — | — | — | — | 0.25 | 100 |
|  | 5-12 | — | — | — | — | — | 0.45 | 109 |

*1 Added amount: added amount (part by mass) of component (A), or component (B-1) or component (B-2) relative to 100 parts by mass of cement
*2 Carbon number of R: carbon number of a group corresponding to R in the general formula (B1)
*3 Molar ratio: ratio (%) of component (B-1) or (B-2) to a naphthalene ring-containing monomer unit in component (A)
*4 Total added amount: total added amount (part by mass) of components (A) and (B) relative to 100 parts by mass of cement From Examples 5-1 to 5-5 wherein component (A) and two components (B) were used, molar ratios of two components (B) were changed and the total added amounts were constant, it was found that higher mortar flow values were observed when, in components (B), the proportion of a compound having R in component (B) with 18 carbon atoms was larger than that of a compound having R in component (B) with 12 carbon atoms. Likewise, from Examples 5-6 to 5-10, it was found that higher mortar flow values were observed when, in components (B), the proportion of a compound having an average number of AO moles added in component (B) of 47 is larger than that of a compound having an average number of AO moles added in component (B) of 13.

Example 6 and Comparative Example 6

Mortars were prepared in the same manner as in Example 1, and the fluidity was evaluated. However, water/cement ratios (W/C) for the mortar blending conditions and added amounts of components (A) and (B) relative to 100 parts by mass of cement were as indicated in Table 6a, 6b, 6c or 6d. In addition, Foamlex 797 (manufactured by Nicca Chemical Co., Ltd.) was used as component (C) for some examples.

Further, the strength of a hardened product of mortar was measured by a fully automatic compression testing machine for concrete "CONCRETO 2000" (manufactured by Shimadzu Corporation).

Results are shown in Table 6a, 6b, 6c or 6d.

TABLE 6

Table 6a

| | | W/C | Component (A) Type | Component (A) Added amount *1 (part by mass) | Component (B) Type | Component (B) Molecular weight | Component (B) Carbon No. of R *2 | Component (B) Added amount *1 (part by mass) |
|---|---|---|---|---|---|---|---|---|
| Examples | 6-1-1 | 35% | Dispersant A | 0.44 | Polyoxyethylene (13) distryenated phenyl ether *5 | 875 | 22 | 0.11 |
| | 6-1-2 | 35% | Dispersant A | 0.30 | Polyoxyethylene (60) oleyl ether | 2911 | 18 | 0.24 |
| | 6-1-3 | 35% | Dispersant A | 0.44 | Polyoxyethylene (13.5) oleyl ether | 863 | 18 | 0.11 |
| Comparative Example | 6-1-1 | 35% | Dispersant A | 0.55 | — | — | — | — |

| | | Component (C) Type | Component (C) Added amount *1 (part by mass) | Total added amount *3 (part by mass) | Molar ratio *4 (%) | Mortar flow (mm) | Strength (N/mm$^2$) |
|---|---|---|---|---|---|---|---|
| Examples | 6-1-1 | Foamlex 797 | 0.02 | 0.57 | 6.9 | 188 | 23.3 |
| | 6-1-2 | Foamlex 797 | 0.02 | 0.57 | 6.7 | 290 | 25.2 |
| | 6-1-3 | Foamlex 797 | 0.02 | 0.57 | 7.0 | 196 | 21.9 |
| Comparative Example | 6-1-1 | Foamlex 797 | 0.02 | 0.57 | — | 141 | 18.9 |

Table 6b

| | | W/C | Component (A) Type | Component (A) Added amount *1 (part by mass) | Component (B) Type | Component (B) Molecular weight | Component (B) Carbon No. of R *2 | Component (B) Added amount *1 (part by mass) |
|---|---|---|---|---|---|---|---|---|
| Examples | 6-2-1 | 35% | Dispersant A | 0.44 | Polyoxyethylene (13) distryenated phenyl ether *5 | 875 | 22 | 0.11 |
| | 6-2-2 | 35% | Dispersant A | 0.30 | Polyoxyethylene (60) oleyl ether | 2911 | 18 | 0.25 |
| | 6-2-3 | 35% | Dispersant A | 0.44 | Polyoxyethylene (13.5) oleyl ether | 863 | 18 | 0.11 |
| Comparative Examples | 6-2-1 | 35% | Dispersant A | 0.55 | — | — | — | — |
| | 6-2-2 | 35% | Dispersant A | 0.15 | Polyoxyethylene (60) oleyl ether | 2911 | 18 | 0.35 |

| | | Component (C) Type | Component (C) Added amount *1 (part by mass) | Total added amount *3 (part by mass) | Molar ratio *4 (%) | Mortar flow (mm) | Strength (N/mm$^2$) |
|---|---|---|---|---|---|---|---|
| Examples | 6-2-1 | — | — | 0.55 | 6.9 | 179 | 16.3 |
| | 6-2-2 | — | — | 0.56 | 6.9 | 275 | 17.6 |
| | 6-2-3 | — | — | 0.55 | 7.0 | 182 | 15.3 |
| Comparative Examples | 6-2-1 | — | — | 0.55 | — | 145 | 15.1 |
| | 6-2-2 | — | — | 0.50 | 19.4 | 106 | 13.9 |

Table 6c

| | | W/C | Component (A) Type | Component (A) Added amount *1 (part by mass) | Component (B) Type | Component (B) Molecular weight | Component (B) Carbon No. of R *2 | Component (B) Added amount *1 (part by mass) |
|---|---|---|---|---|---|---|---|---|
| Examples | 6-3-1 | 45% | Dispersant A | 0.32 | Polyoxyethylene (13) distryenated phenyl ether | 875 | 22 | 0.08 |
| | 6-3-2 | 45% | Dispersant A | 0.22 | Polyoxyethylene (60) oleyl ether | 2911 | 18 | 0.18 |
| | 6-3-3 | 45% | Dispersant A | 0.32 | Polyoxyethylene (13.5) oleyl ether | 863 | 18 | 0.08 |
| Comparative Example | 6-3-1 | 45% | Dispersant A | 0.40 | — | — | — | — |

TABLE 6-continued

| | | Component (C) | | Total | Molar | Mortar | |
| | | Type | Added amount *1 (part by mass) | added amount *3 (part by mass) | ratio *4 (%) | flow (mm) | Strength (N/mm²) |
|---|---|---|---|---|---|---|---|
| Examples | 6-3-1 | Foamlex 797 | 0.01 | 0.41 | 6.9 | 199 | 14.2 |
| | 6-3-2 | Foamlex 797 | 0.01 | 0.41 | 6.8 | 290 | 16.8 |
| | 6-3-3 | Foamlex 797 | 0.01 | 0.41 | 7.0 | 195 | 14.1 |
| Comparative Example | 6-3-1 | Foamlex 797 | 0.01 | 0.41 | — | 180 | 13.0 |

Table 6d

| | | Component (A) | | | Component (B) | | | |
| | | W/C | Type | Added amount *1 (part by mass) | Type | Molecular weight | Carbon No. of R *2 | Added amount *1 (part by mass) |
|---|---|---|---|---|---|---|---|---|
| Examples | 6-4-1 | 55% | Dispersant A | 0.08 | Polyoxyethylene (13) distryenated phenyl ether *5 | 875 | 22 | 0.02 |
| | 6-4-2 | 55% | Dispersant A | 0.056 | Polyoxyethylene (60) oleyl ether | 2911 | 18 | 0.05 |
| | 6-4-3 | 55% | Dispersant A | 0.08 | Polyoxyethylene (13.5) oleyl ether | 863 | 18 | 0.02 |
| Comparative Examples | 6-4-1 | 55% | Dispersant A | 0.10 | — | — | — | — |
| | 6-4-2 | 55% | — | — | Polyoxyethylene (13) distryenated phenyl ether | 875 | 22 | 0.50 |

| | | Component (C) | | Total | Molar | Mortar | |
| | | Type | Added amount *1 (part by mass) | added amount *3 (part by mass) | ratio *4 (%) | flow (mm) | Strength (N/mm²) |
|---|---|---|---|---|---|---|---|
| Examples | 6-4-1 | Foamlex 797 | 0.01 | 0.11 | 6.9 | 215 | 7.1 |
| | 6-4-2 | Foamlex 797 | 0.01 | 0.12 | 7.4 | 225 | 7.7 |
| | 6-4-3 | Foamlex 797 | 0.01 | 0.11 | 7.0 | 209 | 7.3 |
| Comparative Examples | 6-4-1 | Foamlex 797 | 0.01 | 0.11 | — | 207 | 7.0 |
| | 6-4-2 | Foamlex 797 | 0.01 | 0.11 | — | 198 | 7.1 |

*1 Added amount: added amount (part by mass) of component (A), component (B) or component (C) relative to 100 parts by mass of cement
*2 Carbon number of R: carbon number of a group corresponding to R in the general formula (B1)
*3 Total added amount: total added amount (part by mass) of components (A), (B) and (C) relative to 100 parts by mass of cement
*4 Molar ratio: ratio (%) of component (B) to a naphthalene ring-containing monomer unit in component (A)
*5 Polyoxyethylene (13) distryenated phenyl ether: mixture of: a compound having R in the general formula (B1) of a monostyrenated phenyl group; a compound having R in the general formula (B1) of a distyrenated phenyl group; and a compound having R in the general formula (B1) of a tristyrenated phenyl group, wherein R of the mixture has an average carbon number of 22 (equivalent to a distyrenated phenyl group)

From Tables 6a and 6b, it was found that use of component (C) in addition to components (A) and (B) significantly enhanced the cement strength after hardening. This tendency was confirmed even when the water/cement ratio (W/C) was changed.

The invention claimed is:

1. A dispersant composition for a hydraulic composition, comprising (A) a polymer compound having a weight average molecular weight of 5000 and containing a naphthalene ring-containing monomer unit, and (B) one or more compounds represented by the following general formula (B1), wherein a molar ratio of a total amount of (B) to the naphthalene ring-containing monomer unit in (A) is 6% or more and 11% or less, $$R—X-(AO)_n—Y \quad (B1)$$

wherein:
R is an alkyl group having a carbon number of 10 or more and 22 or less, an alkenyl group having a carbon number of 10 or more and 22 or less, a benzyl phenyl group having a carbon number of 13 or more and 27 or less, or a styrenated phenyl group having a carbon number of 14 or more and 30 or less;
X is O or COO;
AO is an alkyleneoxy group having a carbon number of 2 or more and 4 or less;
n represents an average number of AO moles added and is 1 or more and 200 or less; and
Y is a hydrogen atom or an alkyl group having a carbon number of 1 or more and 4 or less.

2. The dispersant composition for a hydraulic composition according to claim 1, further comprising (C) an antifoaming agent.

3. The dispersant composition for a hydraulic composition according to claim 2, wherein (C) the antifoaming agent is a fatty acid ester-based antifoaming agent.

4. The dispersant composition for a hydraulic composition according to claim 1, wherein (A) is a formaldehyde naphthalenesulfonate condensate or a salt thereof.

5. A hydraulic composition comprising a hydraulic powder, water, (A) a polymer compound having a weight average molecular weight of 5000 and containing a naphthalene ring-containing monomer unit, and (B) one or more compounds represented by the following general formula (B1), wherein a molar ratio of a total amount of (B) to the naphthalene ring-containing monomer unit in (A) is 6% or more and 11% or less, and a water/hydraulic powder ratio of the hydraulic composition of 15% or more and 50% or less, R—X-(AO)$_n$—Y    (B1)

wherein:
R is an alkyl group having a carbon number of 10 or more and 22 or less, an alkenyl group having a carbon number of 10 or more and 22 or less, a benzyl phenyl group having a carbon number of 13 or more and 27 or less, or a styrenated phenyl group having a carbon number of 14 or more and 30 or less;
X is O or COO;
AO is an alkyleneoxy group having a carbon number of 2 or more and 4 or less;
n represents an average number of AO moles added and is 1 or more and 200 or less; and
Y is a hydrogen atom or an alkyl group having a carbon number of 1 or more and 4 or less.

6. The hydraulic composition according to claim 5, further comprising (C) an antifoaming agent.

7. The hydraulic composition according to claim 6, wherein (C) the antifoaming agent is a fatty acid ester-based antifoaming agent.

8. The hydraulic composition according to claim 5, wherein (A) is a formaldehyde naphthalenesulfonate condensate or a salt thereof.

9. The hydraulic composition according to claim 5, wherein (A) is contained in an amount of 0.01 parts by mass or more and 2 parts by mass or less relative to 100 parts by mass of the hydraulic powder.

10. The hydraulic composition according to claim 5, wherein (B) is contained in an amount of 0.001 parts by mass or more and 2.0 parts by mass or less relative to 100 parts by mass of the hydraulic powder.

11. A method for manufacturing a dispersant composition for a hydraulic composition, wherein the dispersant composition comprises (A) a polymer compound having a weight average molecular weight of 5000 and containing a naphthalene ring-containing monomer unit and (B) one or more compounds represented by the following general formula (B1),
the method comprising mixing (A) and (B) so that a molar ratio of a total amount of (B) to the naphthalene ring-containing monomer unit in (A) is 6% or more and 11% or less, R—X-(AO)$_n$—Y    (B1)

wherein:
R is an alkyl group having a carbon number of 10 or more and 22 or less, an alkenyl group having a carbon number of 10 or more and 22 or less, a benzyl phenyl group having a carbon number of 13 or more and 27 or less, or a styrenated phenyl group having a carbon number of 14 or more and 30 or less;
X is O or COO;
AO is an alkyleneoxy group having a carbon number of 2 or more and 4 or less;
n represents an average number of AO moles added and is 1 or more and 200 or less; and
Y is a hydrogen atom or an alkyl group having a carbon number of 1 or more and 4 or less.

12. A method for manufacturing a hydraulic composition, the method comprising mixing a hydraulic powder, water, (A) a polymer compound having a weight average molecular weight of 5000 and containing a naphthalene ring-containing monomer unit, and (B) one or more compounds represented by the following general formula (B1),
wherein (B) is mixed so that a molar ratio of a total amount of (B) to the naphthalene ring-containing monomer unit in (A) is 6% or more and 11% or less, R—X-(AO)$_n$—Y    (B1)

wherein:
R is an alkyl group having a carbon number of 10 or more and 22 or less, an alkenyl group having a carbon number of 10 or more and 22 or less, a benzyl phenyl group having a carbon number of 13 or more and 27 or less, or a styrenated phenyl group having a carbon number of 14 or more and 30 or less;
X is O or COO;
AO is an alkyleneoxy group having a carbon number of 2 or more and 4 or less;
n represents an average number of AO moles added and is 1 or more and 200 or less; and
Y is a hydrogen atom or an alkyl group having a carbon number of 1 or more and 4 or less.

13. A method for manufacturing a hydraulic composition, the method comprising
mixing a hydraulic powder, water, and (A) a polymer compound having a weight average molecular weight of 5000 and containing a naphthalene ring-containing monomer unit, and
adding to the mixture (B) one or more compounds represented by the following general formula (B1) so that a molar ratio of a total amount of (B) to the naphthalene ring-containing monomer unit in (A) is 6% or more and 11% or less, R—X-(AO)$_n$—Y    (B1)

wherein:
R is an alkyl group having a carbon number of 10 or more and 22 or less, an alkenyl group having a carbon number of 10 or more and 22 or less, a benzyl phenyl group having a carbon number of 13 or more and 27 or less, or a styrenated phenyl group having a carbon number of 14 or more and 30 or less;
X is O or COO;
AO is an alkyleneoxy group having a carbon number of 2 or more and 4 or less;
n represents an average number of AO moles added and is 1 or more and 200 or less; and
Y is a hydrogen atom or an alkyl group having a carbon number of 1 or more and 4 or less, and
thereby producing a hydraulic composition in which the dispersing performance of polymer (A) is enhanced.

14. A dispersant composition for an inorganic powder, comprising (A) a polymer compound having a weight average molecular weight of 5000 and containing a naphthalene ring-containing monomer unit and (B) one or more compounds represented by the following general formula (B1),
wherein a molar ratio of a total amount of (B) to the naphthalene ring-containing monomer unit in (A) is 6% or more and 11% or less, R—X-(AO)$_n$—Y    (B1)

wherein:
R is an alkyl group having a carbon number of 10 or more and 22 or less, an alkenyl group having a carbon number of 10 or more and 22 or less, a benzyl phenyl group having a carbon number of 13 or more and 27 or less, or a styrenated phenyl group having a carbon number of 14 or more and 30 or less;
X is O or COO;

AO is an alkyleneoxy group having a carbon number of 2 or more and 4 or less;

n represents an average number of AO moles added and is 1 or more and 200 or less; and Y is a hydrogen atom or an alkyl group having a carbon number of 1 or more and 4 or less.

15. The dispersant composition for an inorganic powder according to claim 14, further comprising (C) an antifoaming agent.

16. The dispersant composition for an inorganic powder according to claim 15, wherein (C) the antifoaming agent is a fatty acid ester-based antifoaming agent.

17. The dispersant composition for an inorganic powder according to claim 14, wherein (A) is a formaldehyde naphthalenesulfonate condensate or a salt thereof.

* * * * *